(12) United States Patent
Maki et al.

(10) Patent No.: US 10,381,842 B2
(45) Date of Patent: Aug. 13, 2019

(54) POWER SUPPLY SYSTEM

(71) Applicant: Kabushiki Kaisha Toshiba, Minato-ku (JP)

(72) Inventors: Koji Maki, Musashino (JP); Hiroshi Mochikawa, Hachioji (JP); Makoto Kumai, Yokohama (JP); Hiroaki Matsumoto, Nerima (JP); Shingo Yanagimoto, Koto (JP); Akihiro Matsui, Chigasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 119 days.

(21) Appl. No.: 15/552,348

(22) PCT Filed: Sep. 9, 2016

(86) PCT No.: PCT/JP2016/076616
§ 371 (c)(1),
(2) Date: Aug. 21, 2017

(87) PCT Pub. No.: WO2017/056922
PCT Pub. Date: Apr. 6, 2017

(65) Prior Publication Data
US 2018/0041042 A1  Feb. 8, 2018

(30) Foreign Application Priority Data

Oct. 1, 2015 (WO) .................. PCT/JP2015/077925

(51) Int. Cl.
*H02J 3/38* (2006.01)
*H02J 3/46* (2006.01)
(Continued)

(52) U.S. Cl.
CPC ............... *H02J 3/46* (2013.01); *G05B 15/02* (2013.01); *G05F 1/67* (2013.01); *H02J 3/381* (2013.01);
(Continued)

(58) Field of Classification Search
CPC ................................. H02J 3/38–386
See application file for complete search history.

(56) References Cited

U.S. PATENT DOCUMENTS

| 9,608,439 | B2 * | 3/2017 | Bleisteiner | H02J 3/385 |
| 2013/0077372 | A1 * | 3/2013 | Wagoner | H02J 3/383 363/131 |
| 2013/0234516 | A1 | 9/2013 | Yukizane | |
| 2014/0232206 | A1 * | 8/2014 | Bleisteiner | H02J 3/385 307/131 |
| 2017/0047743 | A1 * | 2/2017 | Toujinbara | H02J 3/385 |

FOREIGN PATENT DOCUMENTS

| JP | 2012-186263 A | 9/2012 |
| JP | 2012-221151 A | 11/2012 |

(Continued)

OTHER PUBLICATIONS

International Search Report dated Nov. 22, 2016 in PCT/JP2016/076616 filed Sep. 9, 2016.

(Continued)

*Primary Examiner* — Fritz M Fleming
(74) *Attorney, Agent, or Firm* — Oblon, McClelland, Maier & Neustadt, L.L.P.

(57) ABSTRACT

A power supply system of an embodiment has a plurality of power conditioners, an acquisition device, and a search instruction generator. The power conditioners convert a form of electrical power generated by a plurality of electrical generators into a different form of electrical power. The acquisition device acquires a respective information regarding power output from each of the plurality of power (Continued)

conditioners. The search instruction generator generates and outputs an operating point search instruction to one or more power conditioners being lower in a ratio of output power with respect to a reference power by at least a prescribed degree than one or more different power conditioners, wherein the reference power is given, based on the maximum output power or rated power of the corresponding electrical generator, or based on the maximum output power or rated power of the power conditioner.

8 Claims, 18 Drawing Sheets

(51) Int. Cl.
  *G05F 1/67* (2006.01)
  *G05B 15/02* (2006.01)
(52) U.S. Cl.
  CPC ............. *H02J 3/382* (2013.01); *H02J 3/383* (2013.01); *H02J 3/385* (2013.01); *Y02E 10/563* (2013.01); *Y02E 10/58* (2013.01)

(56) References Cited

FOREIGN PATENT DOCUMENTS

| | | |
|---|---|---|
| JP | 2013-65797 A | 4/2013 |
| JP | 2013-152675 A | 8/2013 |
| JP | 2013-157595 A | 8/2013 |
| JP | 2013-187496 A | 9/2013 |
| JP | 2013-247855 A | 12/2013 |
| JP | 2014-67259 A | 4/2014 |
| JP | 2014-199477 A | 10/2014 |
| JP | 2014-216507 A | 11/2014 |
| JP | 5617695 B2 | 11/2014 |
| JP | 2015-27143 A | 2/2015 |

OTHER PUBLICATIONS

International Search Report dated Dec. 22, 2015 in PCT/JP2015/077925 (with English translation).

* cited by examiner

POWER SUPPLY SYSTEM

FIELD OF ART

Embodiments of the present invention relate to a power supply system.

BACKGROUND ART

Conventionally, a controller has been known in which an operating voltage at which the power of an electrical generator is maximum is determined as a voltage by a primary search operation, a search is performed by stepwise variation of the operating voltage with a primary operating voltage as a reference, and the operating voltage at which the electrical power is maximum is determined as a secondary search operating voltage. In this apparatus, because the operating voltage is searched for based on information of an electrical generator controlled by the apparatus itself, there has been a case in which it is not possible to appropriately set the search timing for the operating point.

PRIOR ART REFERENCES

Patent References

[Patent Reference 1] Japanese Patent Application Publication No. 2012-221151
[Patent Reference 2] Japanese Patent Application Publication No. 2012-186263
[Patent Reference 3] Japanese Patent Application Publication No. 2014-216507
[Patent Reference 4] Japanese Patent Application Publication No. 2013-157595
[Patent Reference 5] Japanese Patent Application Publication No. 2013-65797

SUMMARY OF THE INVENTION

Problem to be Solved by the Invention

The problem to be solved by the present invention is to provide a power supply system capable of more appropriately establishing the operating point search timing.

Means for Solving the Problem

A power supply system of an embodiment has a plurality of power conditioners, an acquisition device, and a search instruction generator. The power conditioners convert a form of electrical power generated by a plurality of electrical generators into a different form of electrical power. The acquisition device acquires a respective information regarding power output from each of the plurality of power conditioners. The search instruction generator makes reference to the respective information acquired by the acquisition device generates and outputs an operating point search instruction to one or more power conditioners being lower in a ratio of output power with respect to a reference power by at least a prescribed degree than one or more different power conditioners, the one or more different power conditioners and the one or more power conditioners being of the plurality of power conditioners, wherein the reference power is given, based on the maximum output power or rated power of the corresponding electrical generator, or based on the maximum output power or rated power of the power conditioner.

EMBODIMENTS

Power supply systems of embodiments are described below, with references made to the drawings.

First Embodiment

Figure 1:
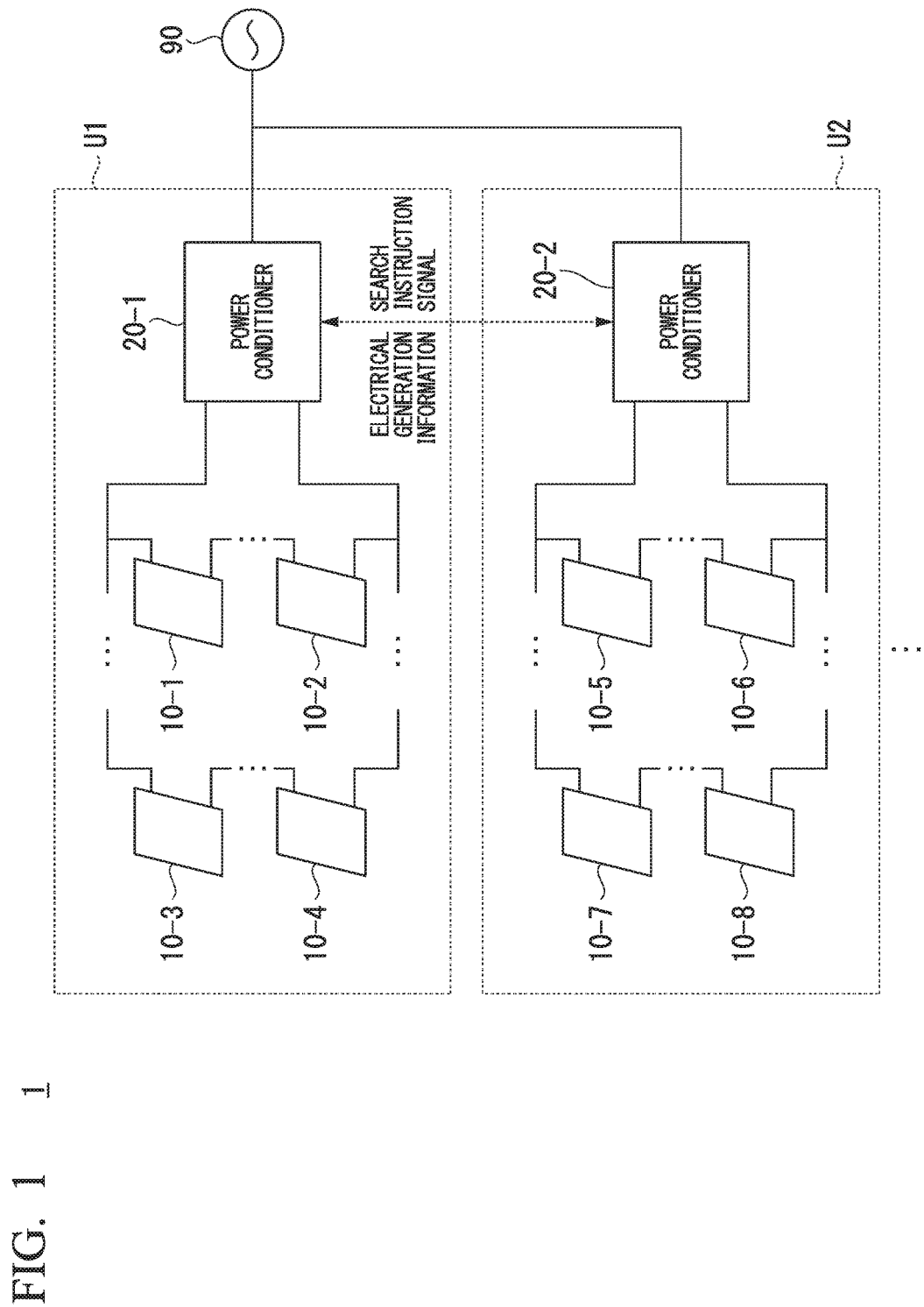
FIG. 1 shows an example of the constitution of a power supply system 1 of a first embodiment.

FIG. 1 shows an example of the constitution of the power supply system 1 of the first embodiment. The power supply system 1 has the plurality of electrical generators 10-1 to 10-8, and the power conditioners 20-1 and 20-2. In the following, in the electrical generators 10 and the power conditioners 20, unless a distinction is made, the hyphen (-) and the number following the hyphen in the reference symbol will be omitted. The power conditioners 20-1 and 20-2 are connected to a grid power source 90. The power supply system 1 may have three or more power conditioners 20.

The electrical generator 10 is, for example, a photovoltaic apparatus. The electrical generators 10 are electrically connected to a power conditioner 20. For example, the electrical generators 10-1 and 10-2 and the electrical generators 10-3 and 10-4 are each connected in series. The series-connected electrical generators 10-1 and 10-2 (string) and the electrical generators 10-3 and 10-4 are connected with parallel with the power conditioner 20-1. The electrical generators 10 convert sunlight energy to direct-current power, which is output to the power conditioners 20. The electrical generator 10, rather than a photovoltaic apparatus, may be another electrical generator of a type in which the output electrical power varies in accordance with the natural environment, such as wind-powered electrical generator or a geothermal electrical generator. In the following, the electrical generators 10-1 to 10-4 and the power conditioner 20-1 will be referred to as the electrical generating unit U-1 and the electrical generators 10-5 to 10-8 and the power conditioner 20-2 will be referred to as the electrical generating unit U-2. In the following, unless a distinction is made between the electrical generating unit U-1 and the electrical generating unit U-2 they will be referred to simply as the electrical generating unit U. The electrical generators 10-1 to 10-4 are an example of "electrical generators corresponding" to the power conditioner 20-1, and the electrical generators 10-5 to 10-8 are an example of "electrical generators corresponding" to the power conditioner 20-2. A diode (not shown) may be connected in series with respect to series-connected electrical generators (a string), in which case the diode is connected in the direction outputting (allowing the flow of current) from the electrical generators to the power conditioner.

The grid power source 90 is, for example, an alternating-current power source supplied from an electrical power company. The grid power source is connected to, for example, a load using alternating current electrical power or, via a power conditioner of a type not shown in FIG. 1, a storage battery.

The power conditioner 20, for example, may be a PCS (power conditioning system) that converts direct-current power generated by the electrical generator 10 to alternating-current power and outputs it to the grid power source 90. In the first embodiment, the power conditioner 20-1 functions as a master apparatus, and the power conditioner 20-2 functions as a slave apparatus. In the following, the description will be of the power conditioner 20-1, which is the master apparatus.

Figure 2:
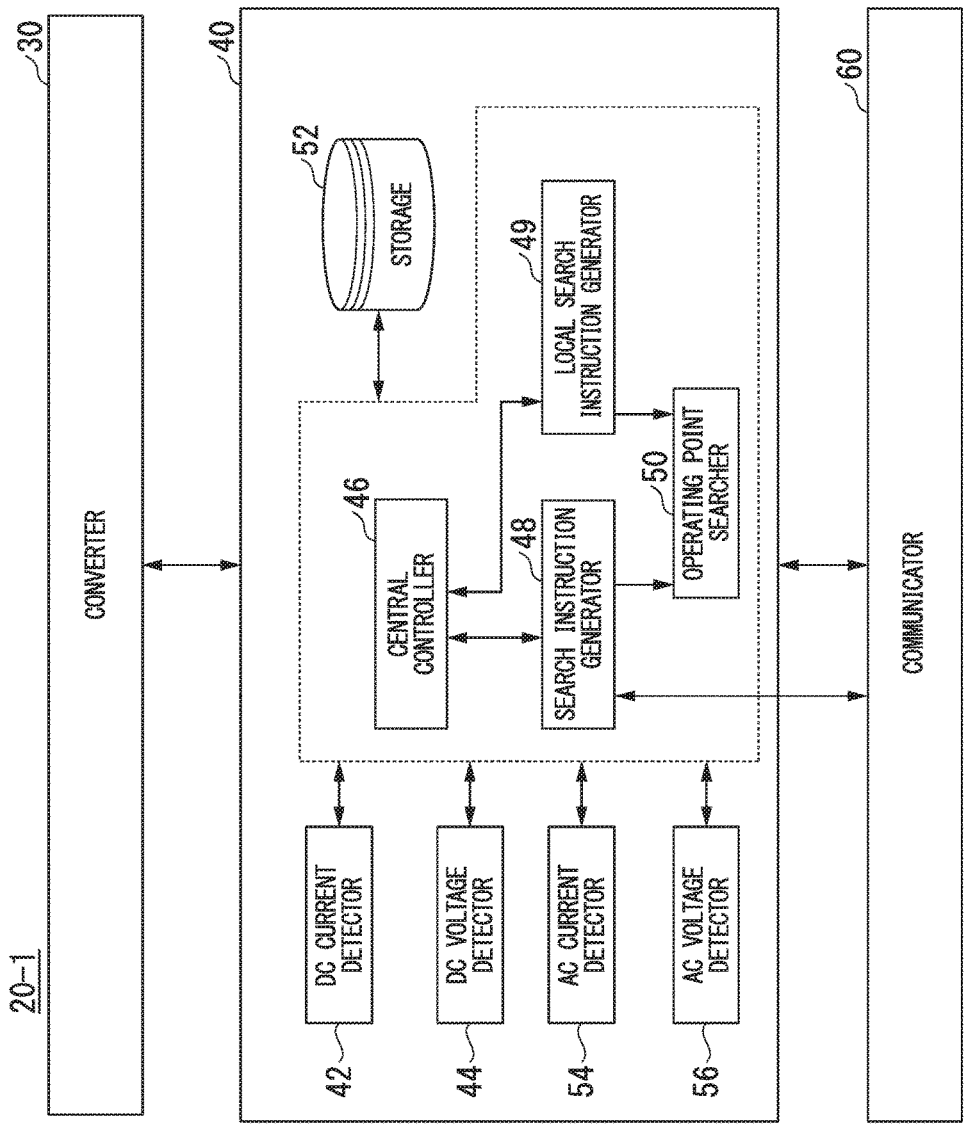
FIG. 2 shows the functional constitution of a power conditioner 20-1.

FIG. 2 shows the functional constitution of the power conditioner 20-1. The power conditioner 20-1 has a converter 30, a controller 40, and a communicator 60.

The converter 30, for example, has a non-illustrated DC (direct current)-to-DC converter, an inverter, and a driver or the like. The DC-DC converter converts the direct-current power input from the electrical generator 10 to direct-current electrical power of the desired current and voltage. The inverter has a plurality of switching elements and, by on-off controlling a switching element based on a gate control signal output from the driver, converts the direct-current electrical power converted by the DC-DC converter to alternating-current electrical power. The driver has a PWM (pulse width modulation) controller, a gate driver, or the like. The PWM controller, based on a signal input from the controller 40, computes the on/off timing of the switching element. The PWM controller generates a PWM signal based on the computed on-off timing and outputs the PWM signal to the gate driver. The gate driver operates the switching element to turn in on and off based on the PWM signal generated by the PWM controller.

The controller 40 has a DC current detector 42, a DC voltage detector, a central controller 46, a search instruction generator 48, a local search instruction generator 49, an operating point searcher 50, a storage 52, an AC current detector 54, and an AC voltage detector 56. Of these functional parts, the central controller 46, the search instruction generator 48, the local search instruction generator 49, and the operating point searcher 50 may be implemented, for example, by a processor such as a CPU (central processing unit) executing a program. These functional parts may also be implemented by hardware such as an LSI (large-scale integration) device, an ASIC (application-specific integrated circuit), or an FPGA (field-programmable gate array).

The storage 52 may be implemented, for example, by a ROM (read-only memory), a RAM (random-access memory), an HD (hard-disk) drive, or a flash memory. The power conditioner 20-2, which is the slave, can be constituted with the search instruction generator 48 omitted from the constitution shown in FIG. 2.

The DC current detector 42 detects the current value of the DC electrical power output from the electrical generator 10. The DC voltage detector 44 detects the voltage value of the DC electrical power output from the electrical generator 10. An estimated value of a DC voltage or a DC current based on other detection information, circuit information, and control information may be used in controlling the central controller 46. Detection information is internal temperature, external temperature, external humidity, and position (GPS) information and the like. Circuit information is the main circuit information for converting from the direct current of the power conditioner 20 to alternating current and is information such as the voltage and current peculiar to the circuit. Control information is a control variable of the power conditioner 20, for example, PI control integrator information (where I indicates integral) to be used in voltage control and current control.

The AC current detector 54 detects the current value of the AC electrical power output from the converter 30. The AC voltage detector 56 detects the voltage value of the AC electrical power output from the converter 30. The AC voltage value and AC current value estimated based on other detection information, circuit information, and control information may be used in control by the central controller 46.

The central controller 46 integrally controls the various parts and controls the operational state (operating or stopped) of the converter 30. The central controller 46 calculates the alternating current electrical power, based on the current value detected by the AC current detector 54 and the voltage value detected by the AC voltage detector 56. The alternating current electrical power corresponds to the output power of the converter 30.

The search instruction generator 48 references the output power of the converter 30 and generates and outputs an operating point search instruction with respect to a converter 30, of the plurality of converters 30, that outputs a power that is a prescribed degree lower than the other converters 30. More specifically, the search instruction generator 48 generates and outputs an operating point search instruction with respect to a converter 30 that has an output power with a ratio to a reference power that is a prescribed degree lower than the other converters 30. The reference power may be the maximum output power or the rated output power of the electrical generator 10, or the maximum output power or rated output power of the converter 30. The reference power may be the limit value of the output power or a command value applied to the power conditioner 20.

The local search instruction generator 49, regardless of the operating point search instruction based on the determination result of the search instruction generator 48, varies the operating point and moves the operating point (search) in the direction in which the output power increases. Because the current and voltage values of the power output by the electrical generator 10 vary depending upon the amount of sunlight and the temperature, the local search instruction generator 49 performs processing to vary the operating point with the set first period and move the operating point in the direction in which the output power increases.

The operating point searcher 50, based on a search instruction generated by the search instruction generator 48 or the search instruction generated by the local search instruction generator 49, searches for the operating point. The operating point, for example, is the point for performing maximum power point tracking (MPPT). The operating point searcher 50, for example, while varying the output current and voltage of the converter 30 within a pre-established range, determines the operating point (output current and output voltage) at which the power output by the electrical generator 10 or the converter 30 is maximum. The search processing for the operating point by an instruction of the local search instruction generator 49 may be simpler than the search processing for the operating point by an instruction of the search instruction generator 48. For example, it may be ended when a local maximum value is determined, or may search over a narrow range.

The storage 52 has stored therein a program that is executed by the central controller 46, the search instruction generator 48, the local search instruction generator 49, or the operating point searcher 50. The storage 52 also has stored therein the reference power.

Wireless communication is performed between the communicator 60 of the power conditioner 20-1 and the communicator 60 of the power conditioner 20-2. For example, between the communicators 60, communication is performed using the low-power wireless 920-MHz band or 2.4-GHz band. The communicator 60 acquires information (electrical generation information) regarding the power output by each of the plurality of power conditioners 20. Between power conditioners 20, communication may be performed by power line communication or via a network NW, such as a LAN (local area network), in which case the power conditioner 20 has a communication interface that handles each of the forms of communication.

Figure 3:
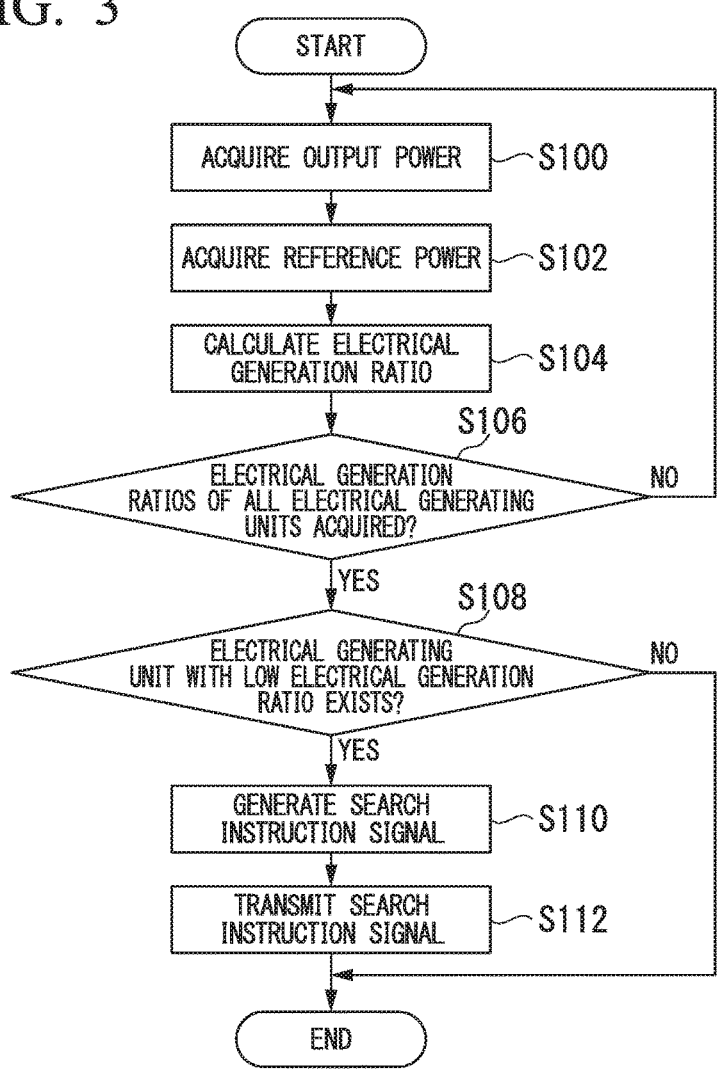
FIG. 3 is a flowchart showing the flow of processing executed by a controller 40.

FIG. 3 is a flowchart showing the flow of processing executed by the controller 40. This processing is repeatedly executed, for example, with a pre-established second time period. The second time period is, for example, longer than the first period.

First, the search instruction generator 48 selects one power conditioner 20 from the other power conditioners 20 or from the central controller 46, and acquires the output power thereof (step S100) via the communicator 60. Next, the search instruction generator 48 acquires from the storage 52 the reference power of the converter 30 thereof (step S102). Next, the search instruction generator 48 calculates the electrical generation ratio by dividing the output power of the converter 30 acquired at step S100 by the reference power acquired at step S102 (step S104). The electrical generation ratio may be acquired from the power conditioner 20 rather than by calculation from the output power and the reference power.

The details of the reference power will now be described. The reference power differs between the case in which the power that is generatable by the electrical generator 10 is smaller than the maximum power or rated power of the converter 30 and the case in which the power that is generatable by the electrical generator 10 is larger than the maximum power or rated power of the converter 30. The reference power, for example, is determined by the output characteristics of the power conditioner 20, which are dependent on the output characteristics of the electrical generator 10 or the converter 30.

Figure 4:
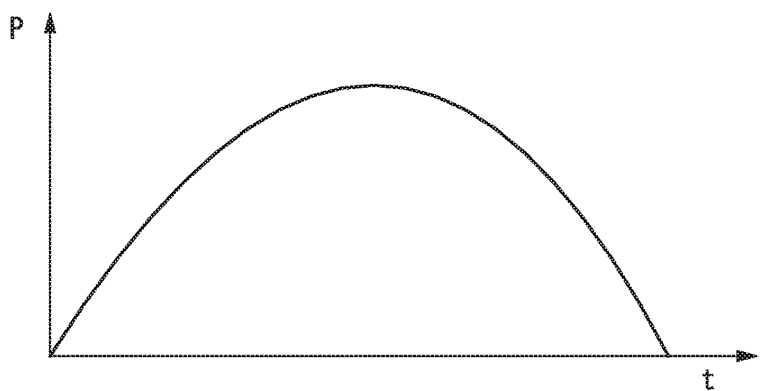
FIG. 4 shows an example of the output characteristics of a power conditioner 20 for the case in which the power that is generatable by an electrical power generator 10 of an electrical power generating unit U is smaller than the maximum power or rated power of a converter 30.

If the rated output power of the electrical generator 10 of the electrical generating unit U is smaller than the rated output power of the converter 30, the reference power is determined by the output characteristics of the electrical generator 10. FIG. 4 shows an example of the output characteristics of an electrical generating unit U for the case in which the power that is generatable by the electrical generator 10 is smaller than the maximum power or rated power of the converter 30. The drawing shows the output power during the times of the day that the electrical generating unit U is generating power over the period of one day. The example illustrated shows the case in which the prescribed irradiance energy at each time is imparted to the electrical generating unit U. The vertical axis represents the output power of the electrical generating unit U and the horizontal axis represents time. In this case, the reference power, for example, is established by the maximum output power or rated output power of the electrical generator 10. The storage 52 includes a map, a function, or a table of data that returns the reference power of the electrical generator 10.

Figure 5:
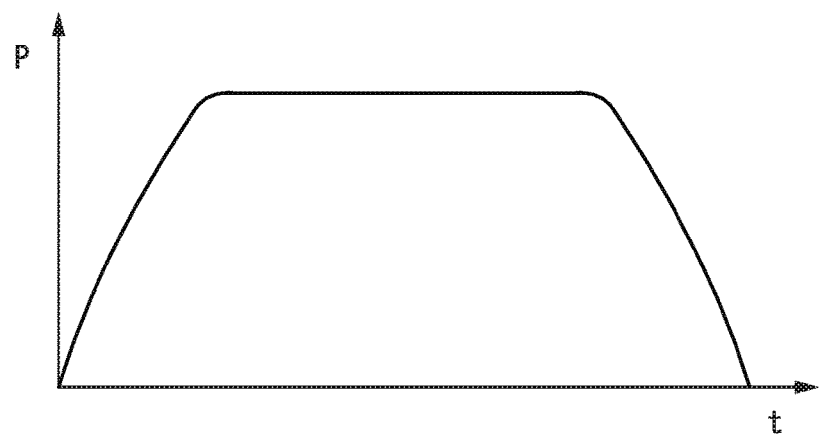
FIG. 5 shows an example of the output characteristics of a power conditioner 20 for the case in which is generatable by the electrical power generator 10 of an electrical power generating unit U is larger than the maximum power or rated power of-the converter 30.

However, if the rated output power of the electrical generator 10 of the electrical generating unit U is larger than the rated output power of the converter 30, the reference power is determined by the output characteristics of the power conditioner 20, which are dependent on the converter 30. FIG. 5 shows the output characteristics of the electrical generating unit U in the case in which the power that is generatable by the electrical generator 10 of the electrical generating unit U is larger than the power than the maximum power or rated power of the converter 30. This drawing shows the output power during the times of the day that the electrical generating unit U is generating power over the period of one day. The example illustrated in this drawing shows the case in which the energy of a prescribed irradiance at each time is imparted to the electrical generating unit U. The vertical axis represents the output power of the electrical generating unit U and the horizontal axis represents time. The reference power, for example is established by the maximum output power or rated output power of the power conditioner 20.

The electrical generation ratio determined at step S104 is calculated by the search instruction generator 48 by dividing the output power of the electrical generating unit U by reference power (maximum output power or rated output power of the electrical generator 10). The search instruction generator 48, for example, references information stored in the storage 52, derives the reference power of the electrical generator 10, and calculates the electrical generation ratio by dividing the output power of the electrical generating unit U at that point in time by the reference power.

Figure 6:
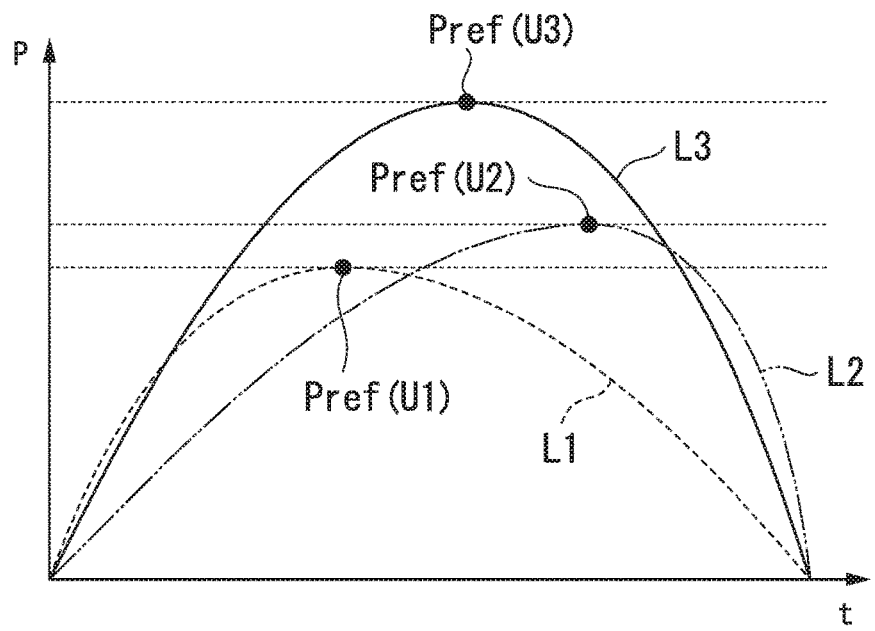
FIG. 6 shows how the reference power Pref is established based on the output characteristics of each unit U.

FIG. 6 shows how the reference power Pref is established, based on the output characteristics of each electrical generating unit U. In this drawing, the premise is that each electrical generating unit U has the output characteristics shown in FIG. 4. The vertical axis represents the output power of the electrical generating unit U, and the horizontal axis represents time. This drawing shows the output power of the electrical generating unit U over one day. The trend curve L1 shows the trend of output power of the electrical generating unit U1 versus time. The trend curve L2 shows the trend of the output power of the electrical generating unit U2 versus time. The trend curve L3 shows the trend of the output power of the electrical generating unit U3 versus time. In the drawing, the maximum output powers of electrical generating units U1 to U3 are represented as Pref(U1), Pref(U2), and Pref(U3), respectively. The electrical generating unit U1, for example, because it faces Eastward, has a large electrical generation amount in the morning. The electrical generating unit U2, for example, because it faces Westward, has a large electrical generation amount in the afternoon. The electrical generating unit U3, for example, faces Southward and has a maximum output power that is larger than that of the electrical generating units U1 and U2. In this case, the reference power Pref(U1) is established as the output power at the time at which the trend curve L1 is the maximum value during one day. The reference power Pref(U2) is established as the output power at the time at which the trend curve L2 is the maximum value during one day. The reference power Pref(U3) is established as the output power at the time at which the trend curve L3 is the maximum value during one day.

Figure 7:
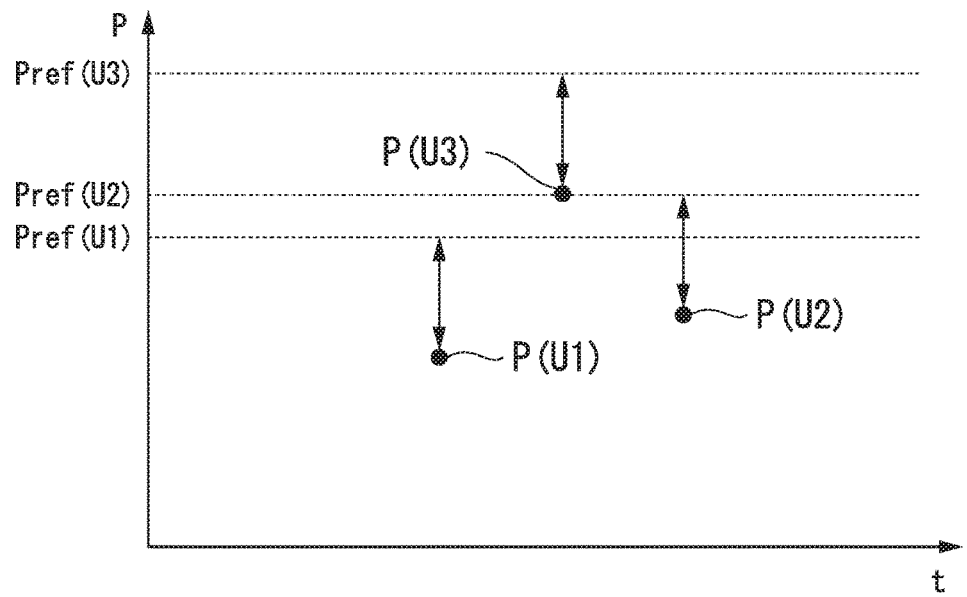
FIG. 7 shows an example of an electrical generation ratio calculation method for the case in which the output characteristics differ between power conditioners 20.

The electrical generation ratio is determined based on the reference power Pref established for each of the electrical generating units U. FIG. 7 shows an example of the power generation calculation method for the case in which the output characteristics differ between the power conditioners 20. The Pref(U1), Pref(U2), and Pref(U3) of the electrical generating units U1, U2, and U3 indicate the reference powers of the electrical generating units U1, U2, and U3, respectively. The search instruction generator 48, for example, determines the electrical generation ratio of the electrical generating unit U1 based on the reference power Pref(U1) and the output power of the electrical generating unit U1 at that point in time. The search instruction generator 48, for example, determines the electrical generation ratio of the electrical generating unit U2 based on the reference power Pref(U2) and the output power of the electrical generating unit U2 at that point in time. The search instruction generator 48, for example, determines the electrical generation ratio of the electrical generating unit U3 based on the reference power Pref(U3) and the output power of the electrical generating unit U3 at that point in time.

Next, the search instruction generator 48 determines whether or not the electrical generation ratios of all the electrical generating unit U (for example, U1, U2, and U3) have been acquired (step S106) If the electrical generation ratios of all the electrical generating units U have not been acquired, return is made to the processing of step S100, the next power conditioner 20 is selected, and the output power thereof is acquired.

If the electrical generation ratios of all electrical generating units U have been acquired, the search instruction generator 48 compares the electrical generation ratios between electrical generating units U and determines whether or not there is an electrical generating unit U having an electrical generation ratio that is lower by at least a prescribed degree than the electrical generation ratio of the other electrical generating units U (step S108). For example, the search instruction generator 48 determines whether or not there is an electrical generating unit U among the electrical generating units U of which the electrical generation ratio was calculated having an electrical generation ratio that is at least a prescribed degree lower. "An electrical generation ratio that is at least a prescribed degree lower" is, for example, if the electrical generation ratios are taken as a data set, a deviation from a representative value of at least α standard deviations (σ), where α may be established arbitrarily in the range of approximately 1 to 3. The search instruction generator 48 may use a known method such as Smirnov-Grubbs to determine whether or not a calculated electrical generation ratio is an outlying value. If the determination is that the calculated electrical generation ratio is an outlying value, the search instruction generator 48 determines that the calculated electrical generation ratio is an electrical generation ratio that is the prescribed degree lower. As described above, although there are cases in which the output characteristics will differ between individual electrical generating units U, depending upon the installation location and direction, the search instruction generator 48 sets the threshold with respect to the deviation for determining an outlier so that it is not affected by a difference in output characteristics dependent upon the installation location or direction.

The search instruction generator 48 may group the electrical generating units U, for example in accordance with the trends in output characteristics, and determine whether or not, among the grouped electrical generating units U, there exists an electrical generating unit U having an electrical generation ratio that is at least a prescribed degree lower. The trends in the output characteristics are trends that classify, for example, into a type that generates a lot during the morning and a type that generates a lot during the afternoon. For example, the search instruction generator 48 groups the electrical generating units U into electrical generating units U that output the maximum power in the morning and electrical generating units U that output the maximum power in the afternoon. By grouping the electrical generating units U in accordance with the trends of their output characteristics, the search instruction generator 48 can control the occurrence of erroneous detection because of time-dependent differences in output characteristics and can more accurately detect abnormalities.

If no electrical generating unit U exists having an electrical generation ratio that is lower by a prescribed degree, the processing of this flowchart ends. If an electrical generating unit U exists having an electrical generation ratio that is lower by a prescribed degree, the search instruction generator 48 generates a search instruction signal (step S110). The search instruction signal gives an instruction to search for an operating point in a range that is set in the operating point searcher 50. Details of this will be described later. Next, the search instruction generator 48 transmits the generated search instruction signal to the electrical generating unit U that was judged at step S108 to have an electrical generation ratio that is lower by a prescribed degree (step S112). This ends the processing of this flowchart.

The reference power is not restricted to being the maximum output power of that electrical generating unit U, and may be the rated output power of the electrical generating unit U. The reference power, for example, may be the maximum output power or rated output power for each time at which there is the ideal sunlight, in which case the reference power is a value that varies with time.

Figure 8:
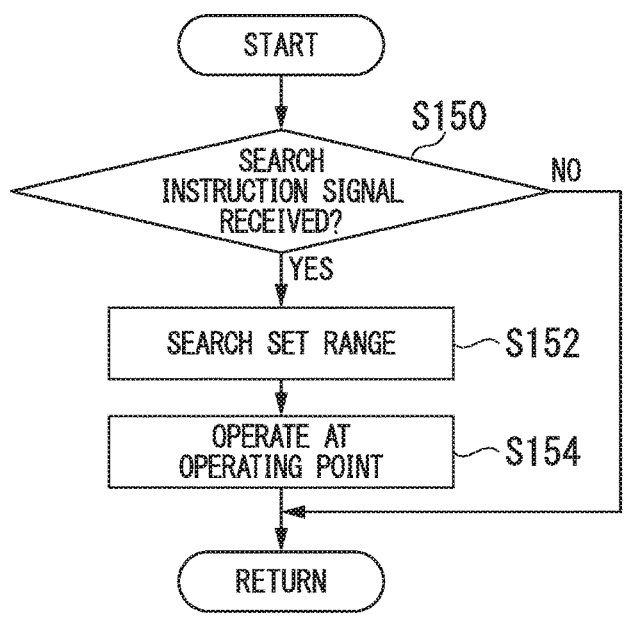
FIG. 8 is a flowchart showing the flow of processing to be executed for the case of the power conditioner 20 receiving a search instruction signal.

FIG. 8 is a flowchart showing the flow of processing executed when the power conditioner 20 receives a search instruction signal. First, the central processor 46 determines whether or not a search instruction signal has been received (step S150). If a search instruction signal has not been received, the routine of this flowchart is ended.

Figure 9:
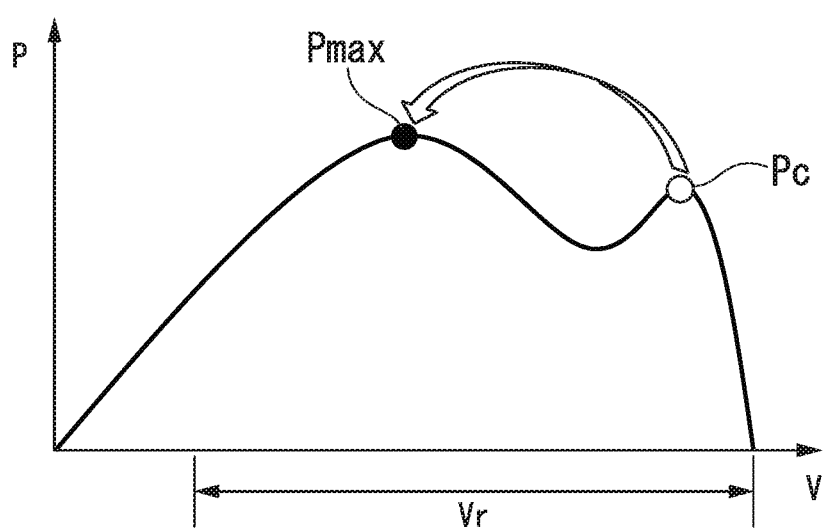
FIG. 9 describes the searching for the operating point executed by the operating point searcher 50.

If a search instruction signal has been received, the operating point searcher 50 searches for an operating point in a set voltage range Vr (step S152). FIG. 9 describes the operating point search executed by the operating point searcher 50. The vertical axis represents the output power of the electrical generating unit U (electrical generator 10), and the horizontal axis represents the output voltage of the electrical generator 10. As shown in this drawing, a plurality of points appear at which the output power is large. This is the influence of a partial shadow in the sunlight on a sub-string connected in series within the electrical generator 10. A sub-string has a plurality of solar cells that are series connected and a bypass diode to prevent the flow of a reverse current, connected in parallel with the series-connected solar cells. If there is a shadow on a part of a sub-string, because there is a circulated current in the bypass diode, a number of points appear at which the output voltage is large. In that case, there is the case in which a point Pc at which the output power is smaller than Pmax, at which the output voltage is maximum, is set as the operating point. When the search instruction signal is received, the operating point searcher 50 of the present embodiment searches for the operating point in the set voltage range Vr. As a result, the operating point searcher 50 can derive the point Pmax at which the output voltage is maximum.

Next, the central processor 46 operates the electrical generator 10 at the operating point found by the operating point searcher 50 (step S154). This ends the routine of this flowchart.

For example, in order to determine whether or not the current operating point enables the maximum output power, if the operating point is searched for with a prescribed time interval, there is a case in which a search for the operating point is done regardless of the current operating point being the operating point enabling the maximum output power. In this case, because some prescribed amount of time is required to perform an operating point search with respect to a prescribed voltage range, there have been cases in which the amount of electrical generation has decreased.

In contrast, the power conditioner 20-1 of the present embodiment transmits a search instruction signal to an electrical generating unit U having an electrical generation ratio that is lower by a prescribed degree. This, by the power conditioner 20 of the electrical generating unit U that has a low electrical generation ratio performing a search for the operating point with respect to a prescribed voltage range, the operating point enabling the maximum power output can be found. As a result, the power conditioner 20-1 can suppress a reduction in electrical generation amount caused by unnecessary operating point searching. The power conditioner 20-1 can also cause the electrical generator 10 to operate at an operating point having a higher electrical generation ratio.

In the present embodiment, although the power conditioner 20-1 functions as a master apparatus, and the power conditioner 20-2 functions as a slave apparatus, each of the power conditioner 20-1 and the power conditioner 20-2 may function as a master apparatus provided with a search instruction generator 48. In that case, each of the power conditioner 20-1 and the power conditioner 20-2 compares the electrical generation ratio of the other power conditioner with its own electrical generation ratio and, if its own electrical generation ratio is low, causes its own local search instruction generator 49 to search for the operating point.

According to the above-described power supply system of the first embodiment, the search instruction generator 48 references the output power of the power conditioners 20 acquired by the communicator 60, the AC current detector 54 and the AC voltage detector 56 and, with respect to a power conditioner 20 of the plurality of power conditioners 20 that has an output power that is a prescribed degree lower than the other power conditioners 20, generates and outputs a search instruction to search for the operating point, thereby enabling more appropriate establishment of the timing of the search for the operating point.

Second Embodiment

The second embodiment will now be described. The points of difference from the first embodiment will be the focus of the description, and functions and the like that are in common with the first embodiment will be omitted. In the second embodiment, a monitoring apparatus 100 references the output power of the power conditioners 20 and, with respect to a power conditioner 20 that has an output power that is at least a prescribed degree lower than the other power conditioners 20, an operating point search instruction is generated and output.

Figure 10:
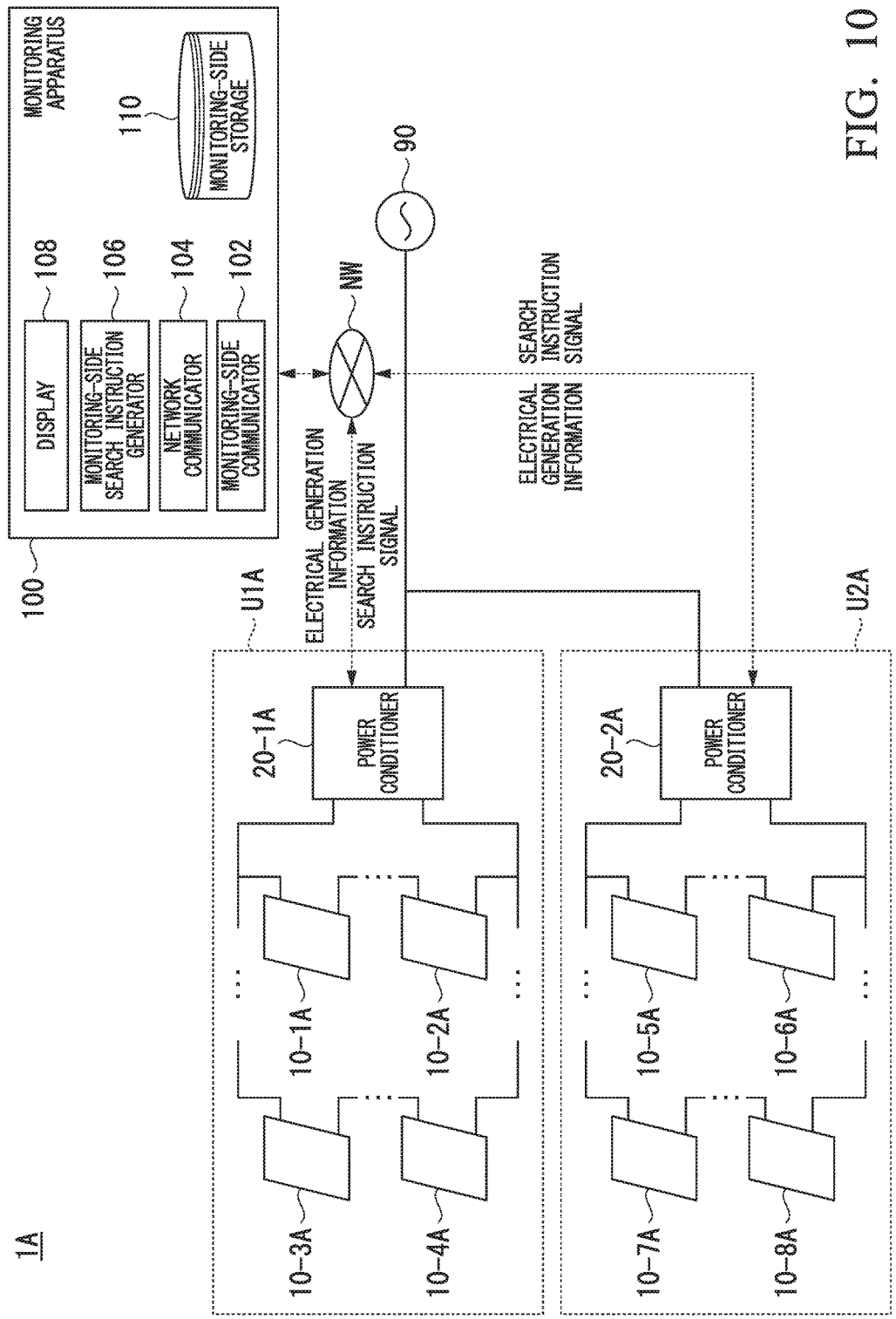
FIG. 10 shows an example of the constitution of a power supply system 1A of a variation example of a second embodiment.

FIG. 10 shows an example of the constitution of a power supply system 1A of the second embodiment. The power supply system 1A, in addition to an electrical generating unit U1A that includes electrical generators 10-1A to 10-4A and a power conditioner 20-1A and an electrical generating unit U1A that includes electrical generators 10-5A to 10-8A and a power conditioner 20-1A, has a monitoring apparatus 100.

The monitoring apparatus 100 has, for example, a monitor-side communicator 102, a network communicator 104, a monitor-side search instruction generator 106, a display 108, and a monitor-side storage 110. The monitor-side communicator 102 communicates with the communicator 60 of the power conditioners 20 via a network NW, such as a LAN. The network communicator 104 is a communication interface capable of connection to an external network NW.

The monitor-side search instruction generator 106 references the output power acquired from the power conditioners 20 and, of the plurality of power conditioners 20, generates and outputs to a power conditioner 20 that has an output power that is at least a prescribed degree lower than the other power conditioners 20 an operating point search instruction.

The display 108 is a display device such as an LED digital display having a plurality of segments, and LCD (liquid crystal display), or an organic EL (electroluminescence) display. The display 108 displays the output power and the like acquired from each of the power conditioners 20.

The monitor-side storage 110 stores a program that is executed by the monitor-side search instruction generator 106. The monitor-side storage 110 also stores information of the reference power of each of the power conditioners 20.

The power conditioners 20-1A and 20-2A of the present embodiment, with the exception of having the search instruction generators 48, have the same constitutions as the power conditioner 20-1 of the first embodiment.

Figure 11:
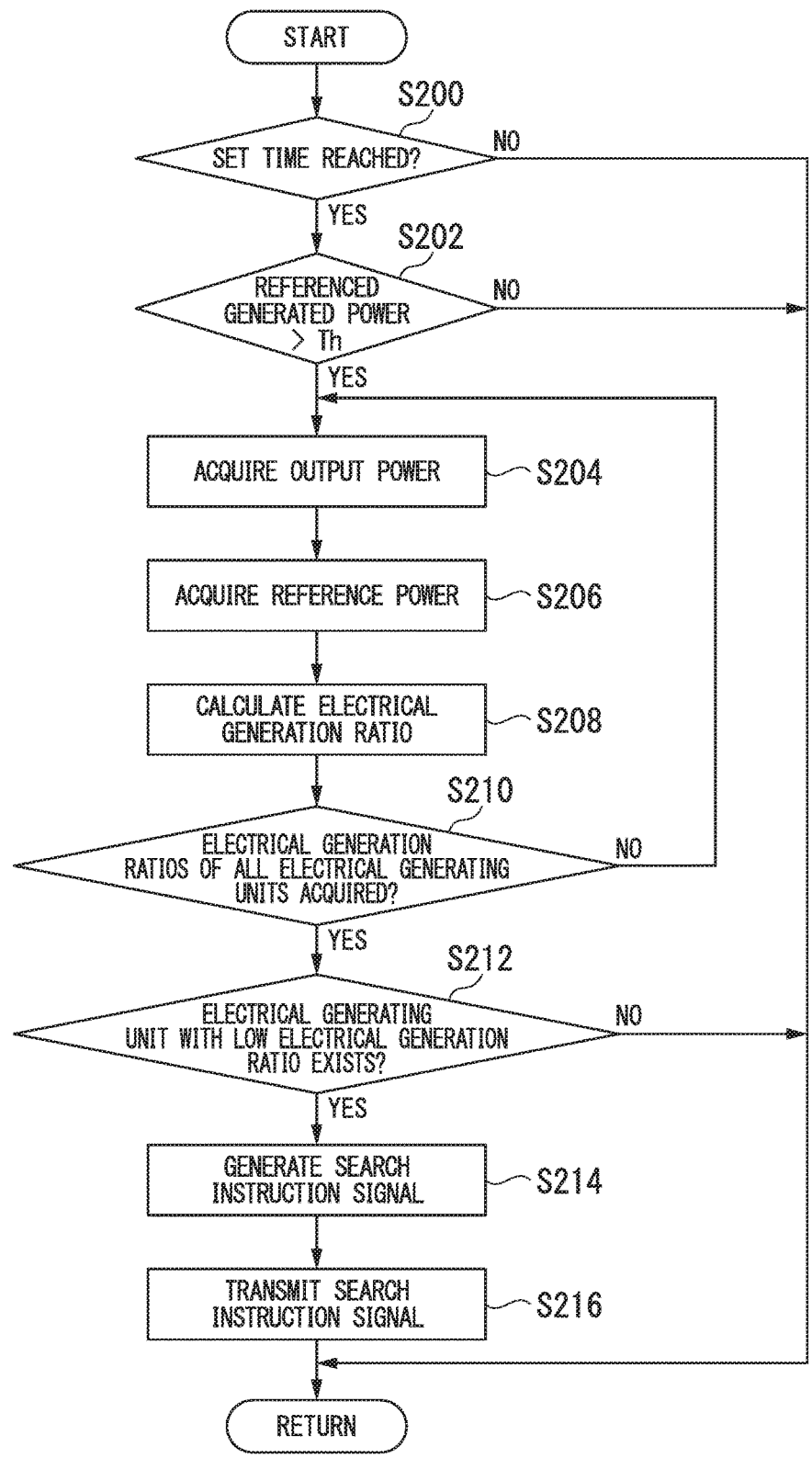
FIG. 11 is a flowchart showing a variation example of the flow of processing executed by a monitoring apparatus 100.

FIG. 11 is a flowchart showing a variation example of the flow of processing executed by the monitoring apparatus 100. In this processing, if a set time is reached and also the generated power is at least a threshold Th, a determination is made of whether or not there exists an electrical generating unit U having a low electrical generation ratio.

First, the monitor-side search instruction generator 106 determines whether or not the set time has been reached (step S200). If the set time has not been reached, the routine of this flowchart ends. If the set time has been reach, the monitor-side search instruction generator 106 determines whether or not the referenced generated power is at least the threshold Th (step S202). The referenced generated power can be the generated power of one of the electrical generating unit U1A and the electrical generating unit U2A, or can be the combined calculated generated power of both thereof.

Figure 12:
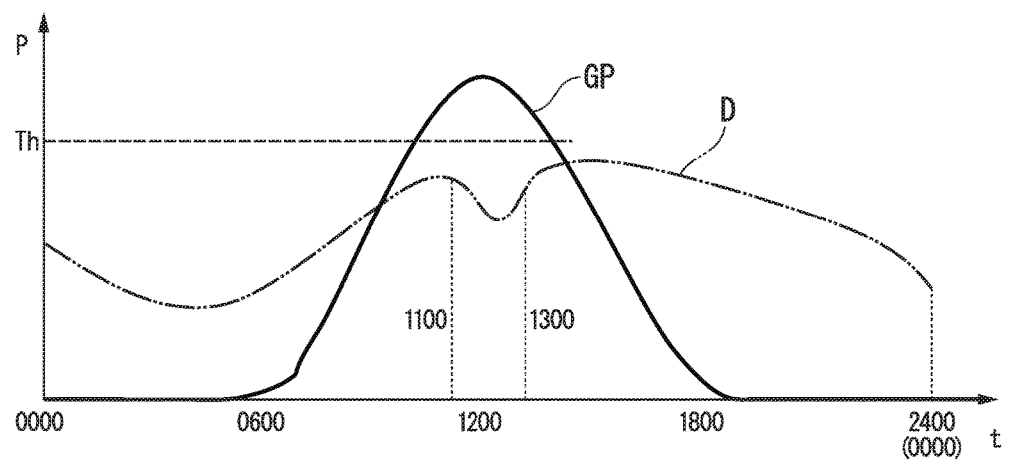
FIG. 12 describes the set time and the generated electrical power.

FIG. 12 describes the set time and the generated electrical power. The vertical axis represents power, and the horizontal axis represents the time t. In this drawing, GP indicates the generated power, and D indicates the power demand. For example, the period from 1100 to 1300, in which the power demand is low during the day, is taken to be the set time in step S200. A power that is greater than the power demand is taken as the threshold Th. By doing this, even if the power conditioner 20 performs a search for the operating point, because there is a generated power margin, a decrease in the supply of power can be suppressed.

If the referenced generated power is below the threshold Th, the routine of the flowchart ends. If, however, the referenced generated power is at least the threshold Th, the monitor-side search instruction generator 106, via the monitor-side communicator 102, selects one power conditioner 20 from the other power conditioners 20 and acquires the output power thereof (step S204). Next, the monitor-side search instruction generator 106 acquires from the monitor-side storage 110 the reference power corresponding to that power conditioner 20 (step S206). Next, the monitor-side search instruction generator 106 divides the output power of the power conditioner 20 acquired at step S106 by the reference power acquired at step S206 to calculate the electrical generation ratio (step S208). Next, the monitor-side search instruction generator 106 determines whether or not the electrical generation ratios of all the electrical generating units U have been acquired (step S210). If the electrical generation ratios of all the electrical generating units U have not been acquired, return is made to the processing of step S204, and the next power conditioner 20 is selected, and the output power thereof is acquired.

If the electrical generation ratios of all the electrical generating units U have been acquired, the monitor-side search instruction generator 106 compares the electrical generation ratios between the electrical generating units U and determines whether or not there exists an electrical generating unit U having an electrical generation ratio that is at least the prescribed degree lower (step S212). If there is no electrical generating unit U having an electrical generation ratio that is at least the prescribed degree lower, the processing of the routine of this flowchart ends. If there is an electrical generating unit U having an electrical generation ratio that is at least the prescribed degree lower, the monitor-side search instruction generator 106 generates a search instruction signal (step S214). Next, the monitor-side search instruction generator 106 transmits the generated search instruction signal to the electrical generating unit having the low electrical generation ratio (step S216). This ends the processing of the routine of this flowchart this flowchart.

Although, in the present embodiment, in the case in which the set time has been reached and also the reference generated power is at least the threshold Th, a determination was made of whether or not there exists an electrical generating unit U with a low electrical generation ratio, if the set time has been reached or the referenced generated power is at least the threshold Th, the monitoring apparatus 100 may determine at a set interval whether or not there exists an electrical generating unit U having a low electrical generation ratio. If the set time has been reached, a signal for causing a search for the operating point in the set voltage range Vr is transmitted to the power conditioner 20, and if the set has time has not been reached, a determination may be made of whether or not there exists an electrical generating unit having a low electrical generation ratio.

According to the above-described power supply system 1A of the second embodiment, the monitoring apparatus 100 references the output power of the power conditioners 20 acquired by the monitor-side communicator 102 and, of the plurality of power conditioners 20, generates and outputs an operating point search instruction to a power conditioner 20 that has an electrical generation ratio that is at least a prescribed degree lower than that of the other power conditioners, thereby enabling more appropriate establishment of the timing of the search for the operating point.

Third Embodiment

The third embodiment will now be described. The points of difference from the first embodiment will be the focus of the description, and functions and the like that are in common with the first embodiment will be omitted. In the third embodiment, the power conditioner 20-1B and 20-2B each having a plurality of converters 30 (not shown) is different from the first embodiment.

Figure 13:
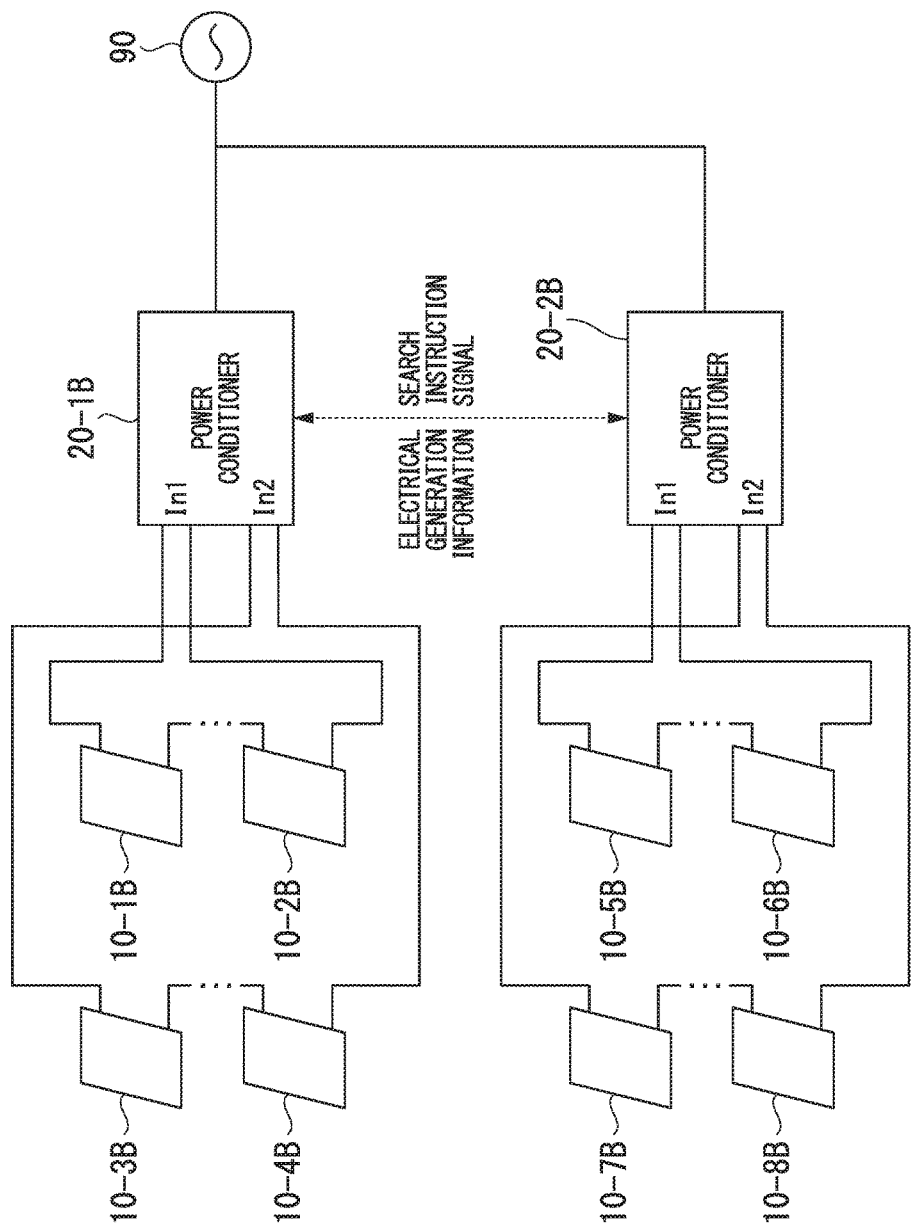
FIG. 13 shows an example of the constitution of a power supply system 1B of a third embodiment.

FIG. 13 shows an example of the constitution of a power supply system 1B of the third embodiment. The power supply system 1B of the third embodiment has electrical generators 10-1B to 10-8B and power conditioners 20-1B and 20-2B. The electrical generators 10-1B and 10-2B, 10-3B and 10-4B, 10-5B and 106B, and 10-7B and 10-8B are each connected in series. In the following, two electrical generators 10 connected in series (as a string) will be called an electrical generator group.

The power conditioner 20-1B and 20-2B have a plurality of converters 30. The converters 30 have a one-to-one correspondence with the electrical generator groups. For example, the DC current output by the electrical generator group of the electrical generators 10-1B and 10-2B is input to the input 1*n*1 of a converter 30 of the power conditioner 20-1B. For example, the DC current output by the electrical generator group of the electrical generators 10-3B and 10-4B is input to the input 1*n*2 of the converter 30 that is different from the converter 30 corresponding to the input 1*n*1 of the power conditioner 20-1B. The power conditioners 20-1B and 20-2B search for an operating point in units of electrical generator groups. The power conditioners 20-1B and 20-2B can, for electrical generator groups having output voltages that are different with respect to an operating point at which the output power of the electrical generator 10 is maximum, search for the operating point in accordance to each thereof. As a result, the power conditioner 20-1B and 20-2B can more appropriately establish the timing of the search for the operating points for each of the electrical generator groups.

The search instruction generator 48 references the output power of the converters 30 and, of the plurality of converters 30, generates and outputs an operating point search instruction with respect to a converter 30 having an output power that is lower than the other converters 30 by a prescribed degree. The reference power is the rated output power of the converter 30 with respect to each input to which a DC current is input from an electrical generator group.

According to the above-described power conditioners 20 of the third embodiment, because the power conditioners 20 can, for electrical generator groups having output voltages that are different with respect to an operating point at which the output power of the electrical generator 10 is maximum, search for the operating point in accordance to each thereof, they can more appropriately establish the timing of the operating point search.

Fourth Embodiment

The fourth embodiment will now be described. The points of difference from the first embodiment will be the focus of the description, and functions and the like that are in common with the first embodiment will be omitted. In the fourth embodiment, a power conditioner 20 being provided for each string and an inverter (string inverter) that converts the DC power output from the electrical generators 10 included in a string to AC power are the differences from the first embodiment.

Figure 14:
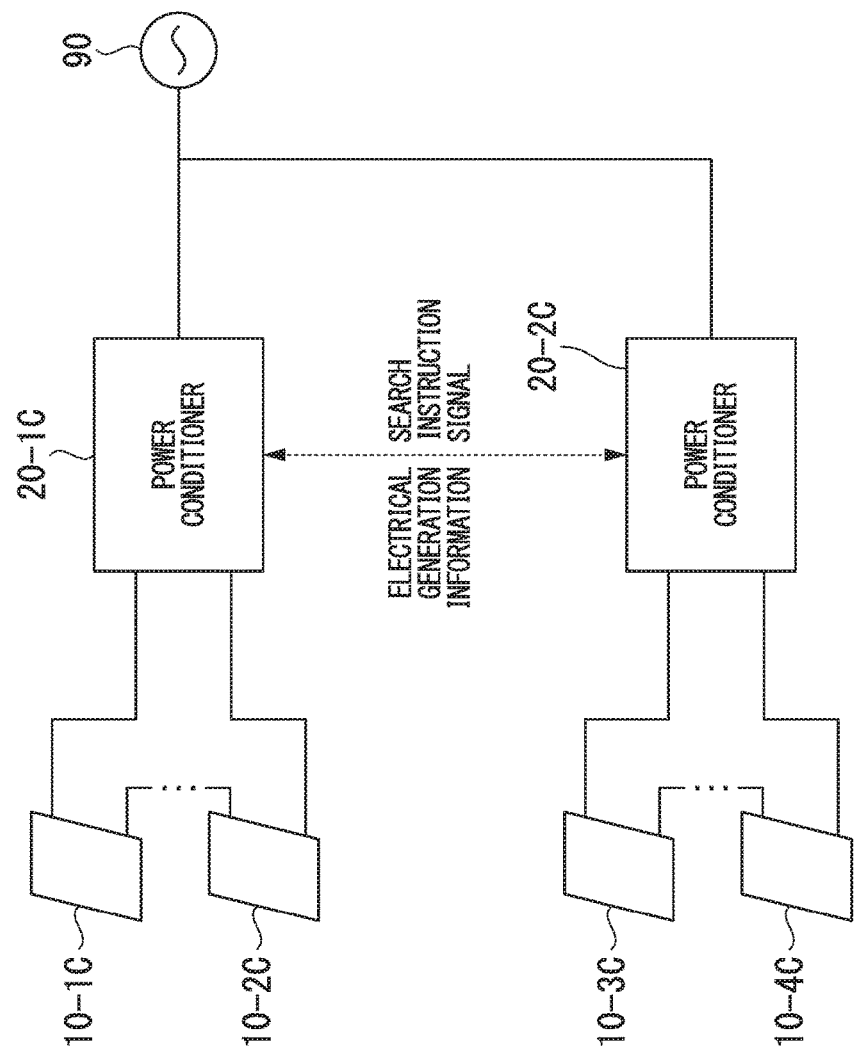
FIG. 14 shows an example of the constitution of a power supply system 1C of a fourth embodiment.

FIG. 14 shows an example of the constitution of a power supply system 1C of the fourth embodiment. The power supply system 1C has electrical generators 10-1C to 10-4C and power conditioners 20-1C and 20-2C. The electrical generators 10-1C and 10-2C are connected in series, and the output terminals of the electrical generators 10-1C and 10-2C are connected to the power conditioner 20-1C. The electrical generators 10-3C and 10-4C are connected in series, and the output terminals of the electrical generators 10-3C and 10-4C are connected to the power conditioner 20-2C.

The converters 30 of the power conditioners 20-1C and 20-2C are string inverters that convert DC power to AC power. The string inverters search for the operating point and perform power conditioning for each of the series-connected electrical generators 10-1C and 10-2C and the series-connected electrical generators 10-3C and 10-4C.

According to the power conditioners 20 of the above-described fourth embodiment, because operating point searching and power conditioning are done for each group of series-connected electrical generators 10, the timing of search for the operating point for each group of individual electrical generator 10 can be more appropriately established.

Fifth Embodiment

Figure 15:
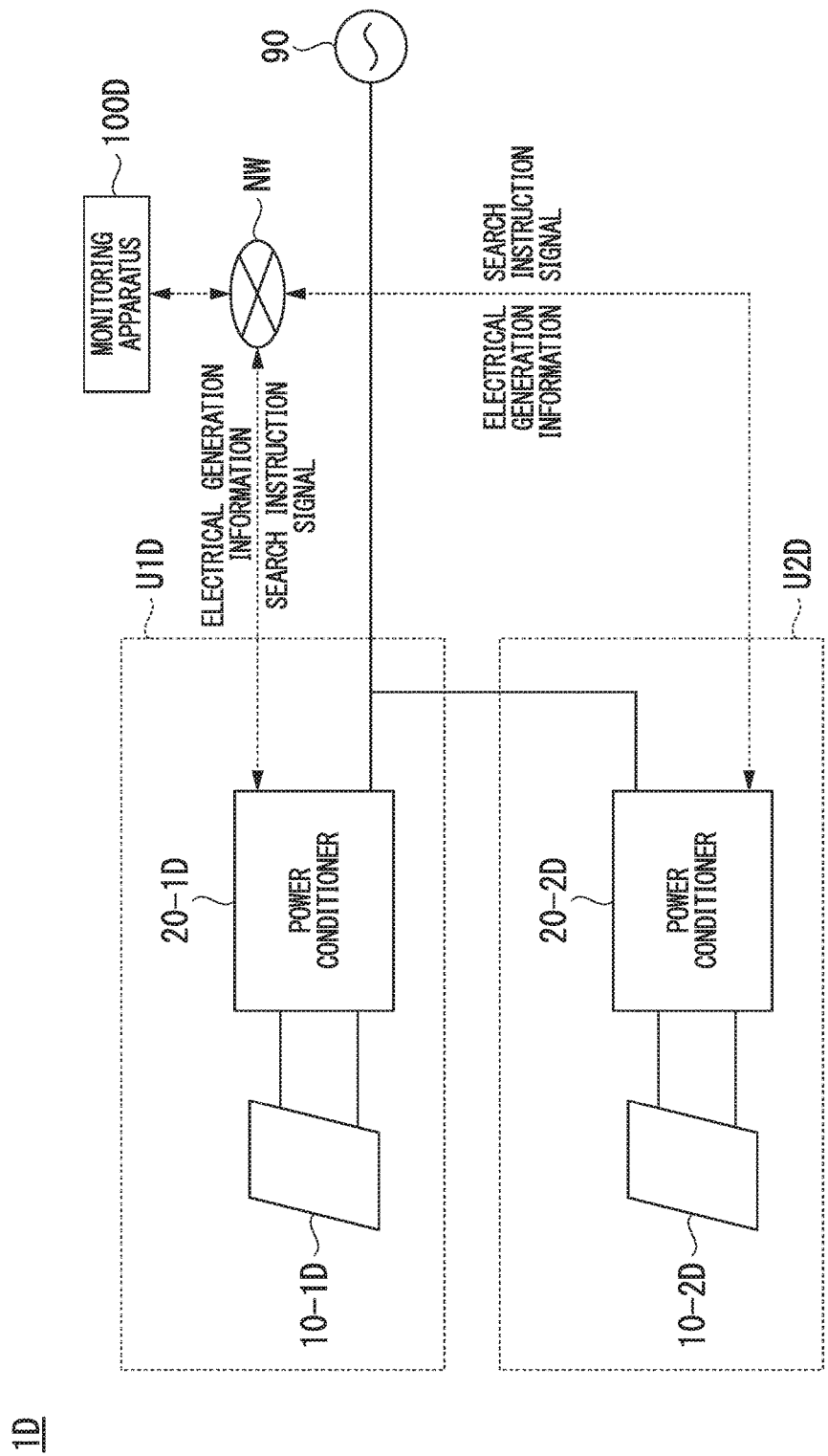
FIG. 15 shows an example of the constitution of a power supply system 1D of a fifth embodiment.

The fifth embodiment will now be described. The points of difference from the fourth embodiment will be the focus of the description, and functions and the like that are in common with the fourth embodiment will be omitted. FIG. 15 shows an example of the constitution of a power supply system 1D of the fifth embodiment. The power supply system 1D has an electrical generator 10-1D, a power conditioner 20-1D that is electrically connected to the electrical generator 10-1D, an electrical generator 10-2D, and a power conditioner 20-2D that is electrically connected to the electrical generator 10-2D. The power conditioners 20-1D and 20-2D of the fifth embodiment are each paired with an electrical generator 10, and these pairs operate in parallel. The power conditioners 20-1D and 20-2D are so-called micro-inverters, which convert the DC power output from the electrical generators 10 to AC power.

The monitor-side search instruction generator 106 of the monitoring apparatus 100D acquires the output powers from the power conditioners 20 and generates and outputs an operating point search instruction with respect to a power conditioner 20, of the plurality of power conditioners 20, that has an output power that is lower than other power conditioners 20 by at least a prescribed degree.

According to the above-described power supply system 1D of the fifth embodiment, because the monitoring apparatus 100D determines whether there exists an electrical generating unit U having an electrical generation ratio lower than a set value, the processing burden on the power conditioner 20 can be reduced.

Sixth Embodiment

Next, the sixth embodiment will be described. The points of difference from the second embodiment will be the focus of the description, and functions and the like that are in common with the second embodiment will be omitted. In the sixth embodiment, the electrical generation controller 120 searches for the operating point of the electrical generator 10.

Figure 16:
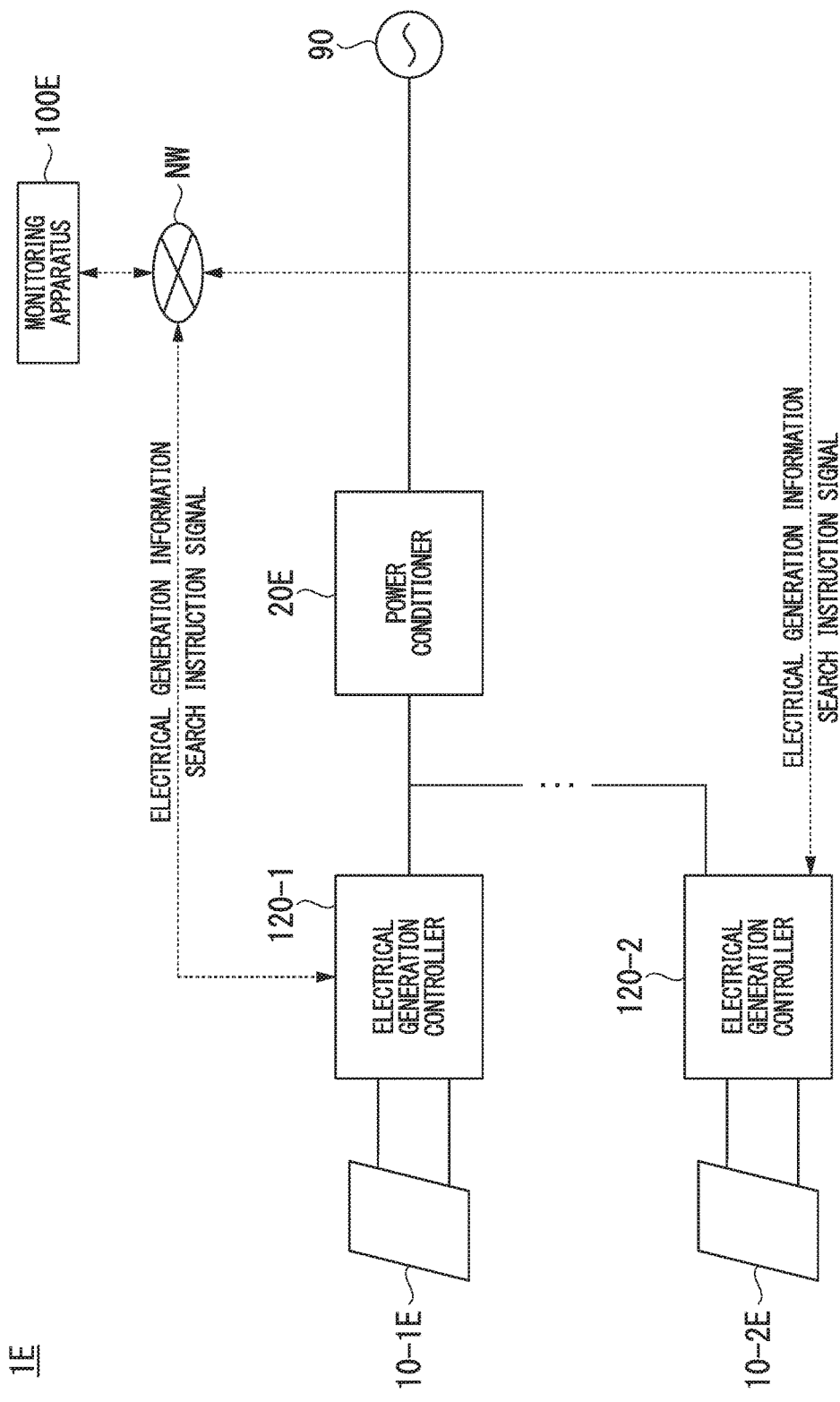
FIG. 16 shows an example of the constitution of a power supply system 1E of a sixth embodiment.

FIG. 16 shows an example of the constitution of a power supply system 1E of the sixth embodiment. The power supply system 1E has an electrical generator 10-1E, an electrical generation controller 120-1 electrically connected to the electrical generator 10-1E, an electrical generator 10-2E, an electrical generation controller 120-2 electrically connected to the electrical generator 10-2E, and a power conditioner 20E electrically connected to the electrical generation controllers 120-1 and 120-2. The power supply system 1E also has a monitoring apparatus 100E that communicates with the electrical generation controller 120-1 and the electrical generation controller 120-2. In the following, unless there is a distinction made between the electrical generation controllers 120-1 and 120-2, they will be referred to as the electrical generation controller 120.

Figure 17:
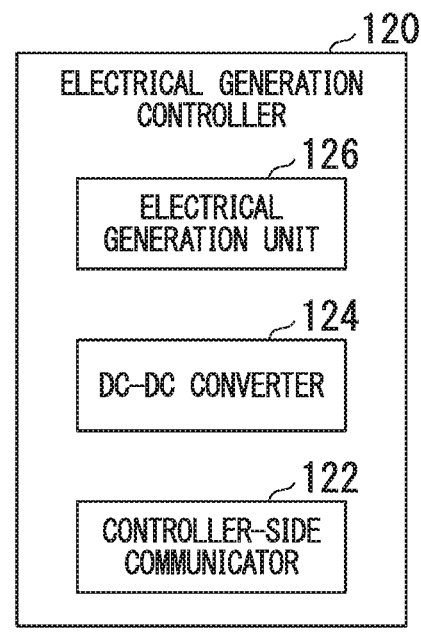
FIG. 17 shows the functional constitution of an electrical generation controller 120.

FIG. 17 shows the functional constitution of the electrical generation controller 120. The electrical generation controller 120 has a controller-side communicator 122, a DC-DC converter 124, and an electrical generation unit 126. The controller-side communicator 122, for example, communicates wirelessly with the monitor-side communicator 102 of the monitoring apparatus 100. The DC-DC converter 124 converts DC power to DC power of a prescribed current and voltage, based on control by the electrical generation unit 126, and outputs the result to the electrical generator 10. The electrical generation unit 126 controls the DC-DC converter 124 and searches for the operating point.

The monitor-side search instruction generator 106 of the monitoring apparatus 100E references the output power of the electrical generation controller 120 acquired by the monitor-side communicator 102 and generates and outputs an operating point search instruction to an electrical generation controller 120, of a plurality of electrical generation controllers, 120 that has an output power that is a prescribed degree lower than that of the other electrical generation controllers 120, thereby enabling more appropriate establishment of the timing of the operating point search.

Figure 18:
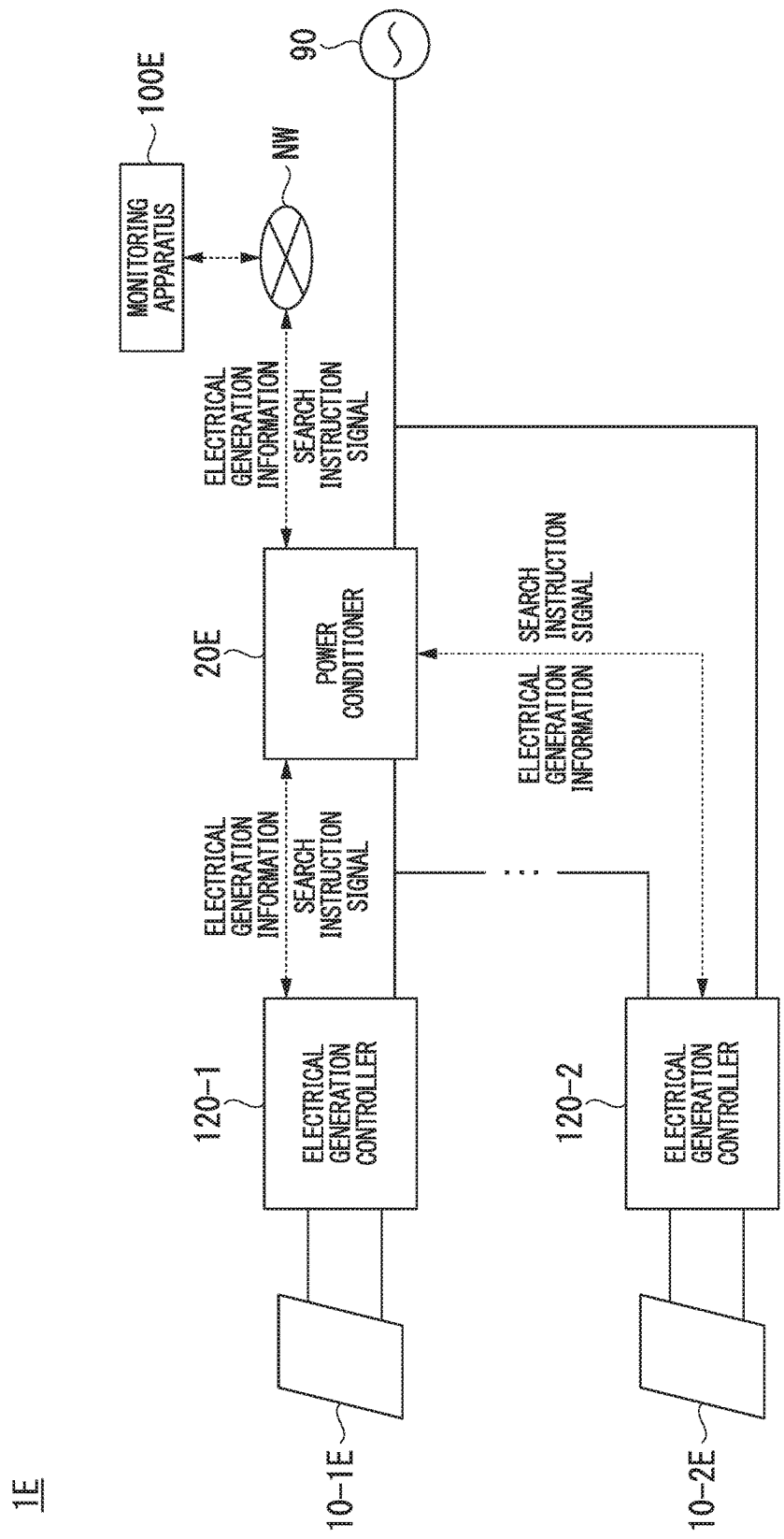
FIG. 18 shows an example of the constitution of the power supply system 1E of a variation example of the sixth embodiment.

FIG. 18 shows an example of the constitution of the power supply system 1E of a variation example of the sixth embodiment. As shown in the drawing, the electrical generation controllers 120 may transmit and receive data with the monitoring apparatus 100 via the power conditioner 20.

According to the above-described power supply system 1E, because the electrical generation controller 120 controls the electrical generators 10, the constitution of the power conditioner 20 can be made simpler.

Seventh Embodiment

Next, the seventh embodiment will be described. The points of difference from the second embodiment will be the focus of the description, and functions and the like that are in common with the second embodiment will be omitted. In the present embodiment, a monitoring apparatus 100F and a plurality of power supply systems 1F-1 to 1F-n (not shown) are connected to a network NW. In the following, unless a distinction is made between the power supply systems 1F-1 to 1F-n, the will be referred to as a power supply system 1F.

Figure 19:
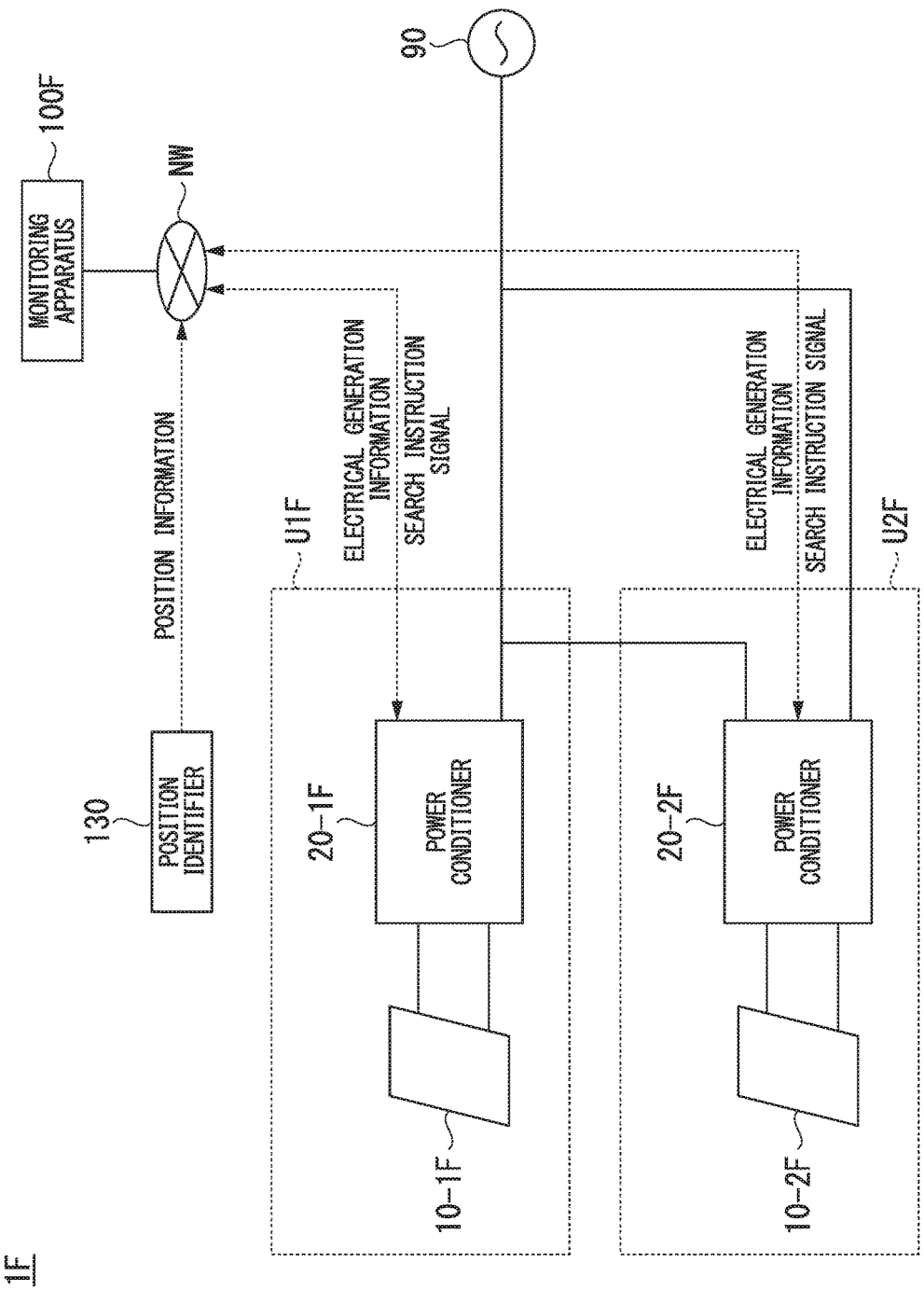
FIG. 19 shows an example of the constitution of a power supply system 1F of a seventh embodiment.

FIG. 19 shows an example of the constitution of a power supply system 1F of the seventh embodiment. In the present embodiment, the power supply system 1F has a position identifier 130. The position identifier 130, for example, receives radio signals from a plurality of GPS (Global Positioning System) satellites. The position identifier 130, based on the received radio signals, identifies its own position by performing a position-finding computation. The position identifier 130 transmits its own position to the monitoring apparatus 100F via the network NW.

The monitor-side search instruction generator 106 of the monitoring apparatus 100, based on the acquired position information, acquires, via the network NW, the output power of the power conditioners 20 belonging to a power supply system 1F that is different from the control target installed in the vicinity of the acquired position. The relationship of correspondence between the plurality of power supply systems 1F and the position information is stored, for example, in the storage 52. The relationship of correspondence between the plurality of power supply systems 1F and the position information is acquired from a host apparatus connected to the network NW. The monitor-side search instruction generator 106, for example via a network NW, acquires the output power of an electrical generating unit U of the control target power supply system 1F and power supply system 1F different from the control target. The monitor-side search instruction generator 106 calculates the electrical generation ratio, based on the output power acquired from the power supply system 1F and the reference power of the electrical generator 10 or power conditioner 20 of the electrical generating unit U. The monitor-side search instruction generator 106 compares the calculated electrical generation ratios and determines whether or not there exists an electrical generating unit U having an electrical generation ratio lower by a prescribed degree. If a power supply system 1F exists having an electrical generation ratio lower by a prescribed degree, the monitor-side search instruction generator 106 generates and outputs an operating point search instruction to the power conditioner 20 of the electrical generating unit U that has an electrical generation ratio lower by the prescribed degree.

According to the above-described power supply system 1F of the seventh embodiment, based on the acquired position information, the electrical generation ratio of a power supply system 1F installed in the vicinity of the control target power supply system 1F and the electrical generation ratio of the control target power supply system 1F are compared and a determination is made of whether or not there exists an electrical generating unit U having an electrical generation ratio that is lower by a prescribed degree.

This enables the power supply system 1F to more appropriately establish the timing of a search for the operating point.

Eighth Embodiment

Next, the eight embodiment will be described. The points of difference from the first embodiment will be the focus of the description, and functions and the like that are in common with the first embodiment will be omitted. In the first embodiment, if the electrical generation ratios of all of the electrical generating units U have been acquired, the search instruction generator 48 compares the electrical generation ratios of the electrical generating units U and determines whether or not an electrical generating unit U having an electrical generation ratio that is lower by a prescribed degree exists. In contrast, in the eighth embodiment, in the power supply system 1, if there is a mixture of power conditioners 20 for which the reference power is the maximum output power or rated output power of the electrical generator 10 and power conditioners 20 for which the reference power is the maximum output power or rated output power of the converter 30, the search instruction generator 48 compares the electrical generation ratios between electrical generating units U, excluding electrical generating units U that satisfy a prescribed condition (for example, those electrical generating units U having the output characteristics of the converter 30 taken as the reference power and having an electrical generation ratio of 100%) and determines whether or not there exists an electrical generating unit U having an electrical generation ratio that is lower by a prescribed degree.

The power supply system 1 of the present embodiment has a plurality of electrical generating units U. In the electrical generating units U, for example, a power conditioner 20 and an electrical generator 10 are paired. Of the electrical generating units U, the reference power of the power conditioner 20 included in at least one electrical generating unit U is the maximum output power or rated output power of the electrical generator 10, and the reference power of the power conditioner 20 included in at least one electrical generating unit U is the maximum output power or rated output power of the converter 30. The storage 52 of the present embodiment has stored therein as reference power information the type of reference power of each of the electrical generating units U, associated therewith. The type of the reference power is information of whether the maximum output power or rated output power of the electrical generator 10 or the maximum output power or rated output power of the converter 30.

Figure 20:
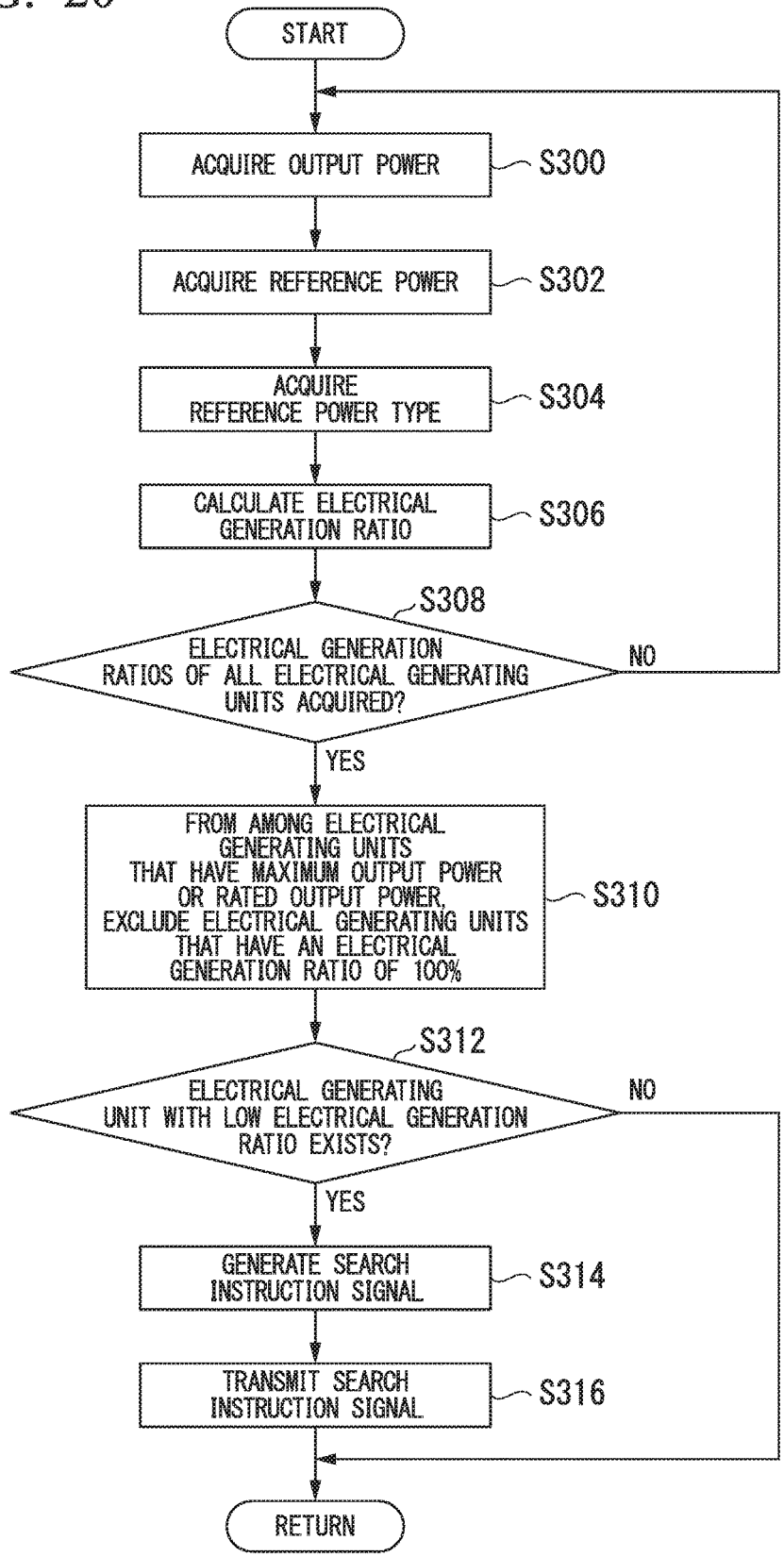
FIG. 20 is a flowchart showing the flow of processing executed by the controller 40 in an eighth embodiment.

FIG. 20 is a flowchart showing the flow of processing executed by the controller 40 of the eighth embodiment. This processing is executed repeatedly, for example with a pre-established second period. The second time period is, for example, longer than the first period.

First, the search instruction generator 48 selects one power conditioner 20 from the other power conditioners 20 or from the central controller 46 and acquires the output power thereof (step S300) via the communicator 60. Next, the search instruction generator 48 acquires from the storage 52 the reference power of the converter 30 thereof (step S302). next, the search instruction generator 48 acquires from the storage 52 the type of reference power corresponding to that converter 30 (step S304). Next, the search instruction generator 48 calculates the electrical generation ratio by dividing the output power of the converter 30 acquired at step S300 by the reference power acquired at step S302 (step S306).

Next, the search instruction generator 48 determines whether or not the electrical generation ratios of all electrical generating units U have been acquired (step S308). If the electrical generation ratios of all the electrical generating units U have been not acquired, return is made to step S300, the next power conditioner 20 is selected, and the output power thereof is acquired.

If the electrical generation ratios of all the electrical generating units U have been acquired, the search instruction generator 48 excludes electrical generating units U that have an electrical generation ratio of 100% from among electrical generating units U that have the maximum output power or rated output power (output characteristics) of the converter 30 as the reference power (step S310). This excludes from monitoring the "electrical generating units U that have an electrical generation ratio of 100%." In this processing, "electrical generating units U that have an electrical generation ratio of 100%," may, for example, be replaced by "electrical generating units U that have an electrical generation ratio of 99.5% or greater." Next, the search instruction generator 48 compares the electrical generation ratios between the electrical generating units U that were not excluded at step S310, and determines whether or not there exists an electrical generating unit U having an electrical generation ratio that is at least a prescribed degree lower (step S312).

If there is no electrical generating unit U having an electrical generation ratio that is lower by a prescribed degree, the processing of this flowchart ends. If there exists an electrical generating unit U having an electrical generation ratio that is lower by a prescribed degree, the search instruction generator 48 generates a search instruction signal (step S314). Next, the search instruction generator 48 transmits the generated search instruction signal to the electrical generating unit U that was judged to have an electrical generation ratio lower by a prescribed degree (step S316). This ends the processing of this flowchart.

Figure 21:
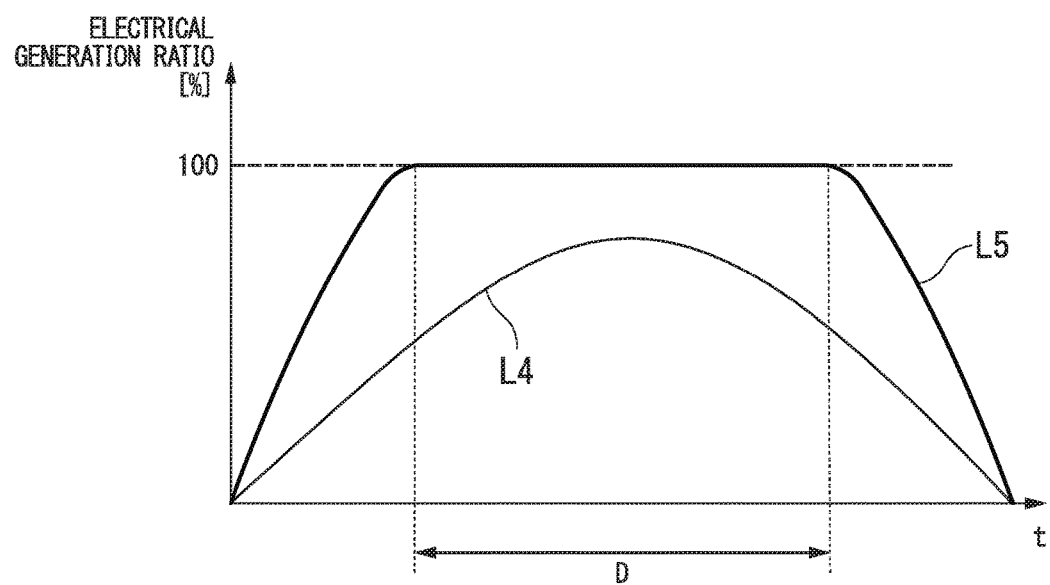
FIG. 21 describes an excluded electrical generating unit U.

FIG. 21 describes an excluded electrical generating unit U. In the drawing, the vertical axis represents the electrical generation ratio (%), and the horizontal axis represents time (t). The trend curve L4 shows the output characteristics of an electrical generating unit U when the power that is generatable by the electrical generator 10 of the electrical generating unit U is lower than the maximum power or rated power of the converter 30. The trend curve L5 shows the output characteristics of the electrical generating unit U when the power that is generatable by the electrical generator 10 of the electrical generating unit U is greater than the power than the maximum output power or rated power the converter 30. In this case, the reference power is established, for example, by the maximum output power or rated output power of the power conditioner 20.

As shown in the drawing, during the time D the electrical generation ratio of the trend curve L5 is 100%. In this time period, an electrical generating unit U corresponding to the trend curve L5 is excluded from monitoring. This is because, if there is a case where there is a spread between the power by the electrical generator 10 included in an electrical generating unit U corresponding to the trend curve L5 and the power converted by the converter 30 of the power conditioner 20, making it impossible to determine with good accuracy whether or not the electrical generation ratio of an electrical generating unit U corresponding to the trend curve L5 is low. As described below, this is also to remove it from being compared with the other electrical generating units U.

Consider the case in which the power that is generatable by the electrical generator 10 eliminates the processing (the processing of the above-described step S310) to exclude an electrical generating unit U that can output a power large than the converter 30 and also has an electrical generation ratio of 100%. In this case, because the reference power is the maximum output power or rated output power of the converter 30, the power actually output by the electrical generator 10 might be greater than the reference power. If an electrical generating unit U in which there is a spread between the power output by the electrical generator 10 and the power output by the converter 30, is made a target of comparison with other electrical generating units U, it could be impossible to judge with good accuracy whether or not there exists an electrical generating unit U having a low electrical generation ratio.

In contrast, in the present embodiment, by excluding electrical generating units U having a electrical generation ratio of 100%, electrical generating units U in which a spread does not occur between the power output by the electrical generator 10 and the power output by the converter 30 are taken as targets for comparison with other electrical generating units U. This enables the power supply system 1 to determine with accuracy whether or not there exists an electrical generating unit U having a low electrical generation ratio.

More specifically, the search instruction generator 48, for example, derives a representative value from all the electrical generation ratios, compares the representative value with the electrical generation ratio of the target electrical generating unit U and, if there is an abnormality in the electrical generating unit U, unless an electrical generating unit U having an electrical generation ratio of 100% is excluded, there is a case in which the representative value differs from the case in which the electrical generation ratio actually output by the electrical generator 10 is taken into account. In the present embodiment, because only the electrical generation ratio derived from the power actually output by the electrical generator 10, it is possible to determine with better accuracy whether or not there exists an electrical generating unit U having a low electrical generation ratio.

If the reference power is the maximum output power or rated output power of the electrical generator 10, the electrical generator 10 might output a power that exceeds the maximum output power or rated output power, in which case the electrical generators 10 of other electrical generating units U operate in the same environment (for example, luminance and temperature). If the maximum output power or rated output power of the power conditioner 20 is greater than power output by the electrical generator 10, the power output by the electrical generator 10 is output without limiting. For that reason, the power supply system 1 can determine with good accuracy whether or not there exists an electrical generating unit U having a low electrical generation ratio, without excluding electrical generating units U having an electrical generation ratio of 100% or greater than 100%.

According to the above-described eighth embodiment, the search instruction generator 48, by excluding electrical generating units U satisfying a prescribed condition in determining whether or not there is an electrical generating unit U having an electrical generation ratio that is lower by a prescribed degree, a more accurate determination can be made of whether or not there exists an electrical generating unit U with a low electrical generation ratio.

The constitutions of the first to the eighth embodiments described above may be arbitrarily combined. For example, in the power supply system 1, of the power conditioners 20-1A and 20-1B (various central inverters), the power conditioner 20-1C (string inverter), the power conditioner 20-1D (micro-inverter), and the electrical generation controller 120 (power optimizer or the like), different power-changing apparatuses may be combined for use.

According to at least one above-described embodiment, by having a plurality of power conditioners (20, 30, 120) that convert a form of electrical power generated by a plurality of electrical generators into a different form of electrical power; an acquisition device that acquires a respective information regarding power output from each of the plurality of power conditioners; a search instruction generator that makes reference to the respective information acquired by the acquisition device generates and outputs an operating point search instruction to one or more power conditioners being lower in a ratio of output power with respect to a reference power by at least a prescribed degree than one or more different power conditioners, the one or more different power conditioners and the one or more power conditioners being of the plurality of power conditioners, wherein the reference power is given, based on the maximum output power or rated power of the corresponding electrical generator, or based on the maximum output power or rated power of the power conditioner, the timing of search for an operating point can be established more appropriately. Although the reference power is made the rated power or the maximum output power, it may be based on a difference index. For example, it may be a power in the NOCT (nominal operation condition temperature).

While certain embodiments of the present inventions have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A power supply system comprising:
a plurality of power conditioners that convert a form of electrical power generated by a plurality of electrical generators into a different form of electrical power;
an acquisition device that acquires a respective information regarding power output from each of the plurality of power conditioners;
a search instruction generator that makes reference to the respective information acquired by the acquisition device generates and outputs an operating point search instruction to one or more power conditioners being lower in a ratio of output power with respect to a reference power by at least a prescribed degree than one or more different power conditioners, the one or more different power conditioners and the one or more power conditioners being of the plurality of power conditioners,
wherein the reference power is given, based on a maximum output power or rated power of a corresponding electrical generator, or based on a maximum output power or rated power of the power conditioner.

2. The power supply system according to claim 1, wherein the power that is generatable by the electrical generator is smaller than the maximum power of the power conditioner.

3. The power supply system according to claim 1, wherein the power that is generatable by the electrical generator is larger than the maximum power of the power conditioner.

4. The power supply system according to claim 1,
wherein the power that is generatable by at least one electrical generator is smaller than the maximum power of the power conditioner, and
the power that is generatable by at least one electrical generator is larger than the maximum power of the power conditioner.

5. A power supply system comprising:
a plurality of power conditioners that convert a form of electrical power generated by a plurality of electrical generators into a different form of electrical power;
an acquisition device that acquires a respective information regarding power output from each of the plurality of power conditioners;
a search instruction generator that makes reference to the respective information acquired by the acquisition device and, generates and outputs an operating point search instruction to one or more power conditioners being lower output power with respect to a reference power by at least a prescribed degree than one or more different power conditioners, the one or more different power conditioners and the one or more power conditioners being of the plurality of power conditioners,
wherein the acquisition device and the search instruction generator are accommodated in or are disposed together with at least one of the plurality of power conditioners,
wherein one or more power conditioners of the plurality of power conditioners do not accommodate in or are not disposed together with the acquisition device and the search instruction generator, and wherein the one or more power conditioners of the plurality of power conditioners transmits to the acquisition device information regarding its own output power and receives search instruction from the search instruction generator.

6. The power supply system according to claim 5,
wherein the search instruction generator generates and outputs an operating point search instruction to one or more power conditioners being lower in a ratio of output power with respect to a reference power by at least a prescribed degree than one or more different power conditioners, the one or more different power conditioners and the one or more power conditioners is of the plurality of power conditioners,
the reference power is established for each of the power conditioners, based on a maximum output power or rated power of a corresponding electrical generator, or based on a maximum output power or rated power of the power conditioner.

7. The power supply system according to claim 1 or claim 5, wherein the power conditioner, regardless of the operating point search instruction from the search instruction generator, performs processing to vary an operating point and move the operating point in a direction in which the output power increases.

8. The power supply system according to claim 1 or claim 5, wherein the acquisition device and the search instruction generator are installed in a location different from the plurality of power conditioners.

* * * * *